United States Patent
Gunnarsson et al.

(10) Patent No.: US 9,398,595 B2
(45) Date of Patent: Jul. 19, 2016

(54) METHODS AND ARRANGEMENTS FOR HANDLING CARRIER SELECTION

(75) Inventors: Fredrik Gunnarsson, Linköping (SE); Klas Johansson, Sundbyberg (SE); Torbjörn Wigren, Uppsala (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 357 days.

(21) Appl. No.: 13/703,669

(22) PCT Filed: Mar. 7, 2012

(86) PCT No.: PCT/SE2012/050259
§ 371 (c)(1),
(2), (4) Date: Dec. 12, 2012

(87) PCT Pub. No.: WO2012/121656
PCT Pub. Date: Sep. 13, 2012

(65) Prior Publication Data
US 2013/0094385 A1    Apr. 18, 2013

Related U.S. Application Data

(60) Provisional application No. 61/450,346, filed on Mar. 8, 2011.

(51) Int. Cl.
*G06F 11/00* (2006.01)
*H04J 1/16* (2006.01)
(Continued)

(52) U.S. Cl.
CPC .......... *H04W 72/085* (2013.01); *H04W 74/008* (2013.01); *H04W 24/10* (2013.01); *H04W 28/048* (2013.01); *H04W 72/02* (2013.01)

(58) Field of Classification Search
CPC .......................... H04W 72/085; H04W 74/008
USPC .......................... 370/252, 253, 254, 328, 329
See application file for complete search history.

(56) References Cited

U.S. PATENT DOCUMENTS 8,743,725 B2 * 6/2014 Wigren ..................... G01S 5/06
                                                    370/252
8,830,908 B2 * 9/2014 Duan et al. ..................... 370/328
(Continued)

FOREIGN PATENT DOCUMENTS

CN         1917693 A      2/2007
WO     2010048419 A2      4/2010
(Continued)

OTHER PUBLICATIONS

U.S. Appl. No. 61/444,670, filed Feb. 18, 2011.*
(Continued)

*Primary Examiner* — Chuong T Ho
(74) *Attorney, Agent, or Firm* — Patents on Demand, P.A.; Brian K. Buchheit; Scott M. Garrett

(57) ABSTRACT

A method in at least one radio network node for handling earner selection comprises measuring at least one of interference or load levels on at least two uplink carriers, said measurement being performed in at least one sector of each carrier, calculating an offset based on said measured Interference or said measured load levels on the at least two uplink carriers, said offset reflecting the interference or load difference between the uplink carriers, and signaling said offset to a communication device, thereby allowing said communication device to base its carrier selection for random access at least on said measured interference or load levels on said at least two uplink carriers.

23 Claims, 18 Drawing Sheets

(51) Int. Cl.
*H04L 1/00* (2006.01)
*H04L 12/26* (2006.01)
*H04W 72/08* (2009.01)
*H04W 74/00* (2009.01)
*H04W 24/10* (2009.01)
*H04W 28/04* (2009.01)
*H04W 72/02* (2009.01)

(56) References Cited

U.S. PATENT DOCUMENTS

| | | |
|---|---|---|
| 2009/0047984 A1 | 2/2009 | Gollamudi et al. |
| 2009/0086861 A1* | 4/2009 | Yavuz et al. ............... 375/346 |
| 2009/0088080 A1 | 4/2009 | Zhang et al. |
| 2010/0062717 A1* | 3/2010 | Brisebois et al. ........... 455/63.1 |
| 2010/0130219 A1* | 5/2010 | Cave et al. .................. 455/450 |
| 2010/0177654 A1* | 7/2010 | Charbit et al. ............... 370/252 |
| 2010/0227615 A1 | 9/2010 | Gaal et al. |
| 2011/0098076 A1* | 4/2011 | Kim et al. .................... 455/522 |
| 2011/0249641 A1 | 10/2011 | Kwon et al. |
| 2012/0093011 A1* | 4/2012 | Ranta-Aho et al. ........... 370/252 |
| 2012/0149413 A1* | 6/2012 | Pedersen ..................... 455/501 |
| 2012/0178373 A1* | 7/2012 | Brisebois et al. ............ 455/63.1 |
| 2012/0201285 A1* | 8/2012 | Semenov et al. ............. 375/227 |
| 2012/0213058 A1* | 8/2012 | Duan et al. ................... 370/221 |
| 2012/0269166 A1* | 10/2012 | Chin et al. .................... 370/331 |
| 2012/0327878 A1* | 12/2012 | Pedersen et al. ............. 370/329 |
| 2015/0098412 A1* | 4/2015 | Yerramalli ............ H04W 16/14 370/329 |

FOREIGN PATENT DOCUMENTS

| | | |
|---|---|---|
| WO | 2010064858 A2 | 6/2010 |
| WO | 2010124228 A2 | 10/2010 |

OTHER PUBLICATIONS

3rd Generation Partnership Project. 3GPP TS 25.211 V8.7.0 (Sep. 2010). 3rd Generation Partnership Project;Technical Specification Group Radio Access Network; Physical channels and mapping of transport channels onto physical channels (FDD) (Release 8), Sep. 2010, pp. 1-58.

3rd Generation Partnership Project. 3GPP TS 25.213 V8.5.0 (Dec. 2009). 3rd Generation Partnership Project; Technical Specification Group Radio Access Network; Spreading and modulation (FDD) (Release 8), Dec. 2009, pp. 1-36.

3rd Generation Partnership Project. 3GPP TS 25.214 V8.11.0 (Dec. 2010). 3rd Generation Partnership Project; Technical Specification Group Radio Access Network; Physical layer procedures (FDD) (Release 8), Dec. 2010, pp. 1-95.

3rd Generation Partnership Project. 3GPP TS 25.304 V8.12.0 (Jun. 2011). 3rd Generation Partnership Project; Technical Specification Group Radio Access Network; User Equipment (UE) procedures in idle mode and procedures for cell reselection in connected mode (Release 8), Jun. 2011, pp. 1-50.

3rd Generation Partnership Project. 3GPP TS 25.331 V8.15.0 (Jun. 2011). 3rd Generation Partnership Project; Technical Specification Group Radio Access Network; Radio Resource Control (RRC); Protocol specification (Release 8), Jun. 2011, pp. 1-1409.

3rd Generation Partnership Project. 3GPP TS 25.433 V8.12.0 (Jun. 2011). 3rd Generation Partnership Project; Technical Specification Group Radio Access Network; UTRAN Iub interface Node B Application Part (NBAP) signalling (Release 8), Jun. 2011, pp. 1-127.

* cited by examiner

| SFN modulo 8 of corresponding PCCPCH frame | Sub-channel number | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 0 | 0 | 1 | 2 | 3 | 4 | 5 | 6 | 7 | | | 10 | 11 |
| 1 | 12 | 13 | 14 | | | | | | 8 | 9 | 10 | 11 |
| 2 | | | | 0 | 1 | 2 | 3 | 4 | 5 | 6 | 7 | |
| 3 | 9 | 10 | 11 | 12 | 13 | 14 | | | | | | 8 |
| 4 | 6 | 7 | | | | | 0 | 1 | 2 | 3 | 4 | 5 |
| 5 | | | 8 | 9 | 10 | 11 | 12 | 13 | 14 | | | |
| 6 | 3 | 4 | 5 | 6 | 7 | | | | | 0 | 1 | 2 |
| 7 | | | | | | 8 | 9 | 10 | 11 | 12 | 13 | 14 |

Fig. 4

METHODS AND ARRANGEMENTS FOR HANDLING CARRIER SELECTION

TECHNICAL FIELD

The invention relates to methods and arrangements for handling carrier selection for performing random access.

BACKGROUND

In a typical cellular radio system, also referred to as a wireless communication system, user equipments, also known as mobile terminals and/or wireless terminals, communicate via a Radio Access Network (RAN) to one or more core networks. The user equipments may be mobile stations or user equipment units such as mobile telephones also known as "cellular" telephones, and laptops with wireless capability, and thus may be, for example, portable, pocket, hand-held, computer-included, or car-mounted mobile devices which communicate voice and/or data with the radio access network. The user equipment may also be referred to as a communication device, a terminal or a UE.

The radio access network covers a geographical area which is divided into cell areas, with each cell area being served by a base station, e.g., a Base station (BS), which in some networks is also called Radio Base Station (RBS), "eNB", "eNodeB", "NodeB" or "B node" and which in this patent also is referred to as a base station. A cell is a geographical area where radio coverage is provided by the base station equipment at a base station site. The base stations communicate over the air interface operating on radio frequencies with the user equipment units within range of the base stations.

In some versions of the radio access network, several base stations are typically connected, e.g. by landlines or radio link, to a Radio Network Controller (RNC). The radio network controller, also sometimes termed a Base Station Controller (BSC), supervises and coordinates various activities of the plural base stations connected thereto. The radio network controllers are typically connected to one or more core networks.

FIG. 1 is a schematic block diagram illustrating the architecture of a Radio Access Network (RAN) 101.

The UE 102 is the mobile terminal by which a subscriber can access services offered by the operator's Core Network (CN) 103.

The RAN 101 is the part of the network that is responsible for the radio transmission and control of the radio connection.

The Radio Network Subsystem (RNS) 104 controls a number of Base Stations (BS) 105 in the radio access network.

The Radio Network Controller (RNC) 106 controls radio resources and radio connectivity within a set of cells.

The BS 105 handles the radio transmission and reception within one or more cells.

A cell covers a geographical area. The radio coverage in a cell is provided by base station equipment at the base station site. Each cell is identified by a unique identity, which is broadcast in the cell. There may be more than one cell covering the same geographical area.

A radio link is a representation of the communication between a UE 102 and one cell in the RAN 101.

The Iub/Iur interfaces are interfaces connecting the different nodes in the RAN 101. User data is transported on so-called transport bearers on these interfaces. Dependant on the transport network used, these transport bearers could e.g. be mapped to AAL2 connections (in case of an ATM based transport network) or UDP connections (in case of an IP based transport network).

In 3GPP Release 99, the retransmission scheme of the dedicated channels (DCH) is part of the radio link control (RLC) protocol layer, which terminates in the UE 102 and the RNC 106. When High Speed Downlink Packet Access (HSDPA) was introduced, some control functions were relocated from the RNC to the base station. These include fast retransmissions in the media access control (MAC) layer from the base station when transmissions fail. Also an enhanced uplink (EUL) has been introduced in WCDMA with similar retransmission mechanisms in MAC. The collective term High Speed Packet Access (HSPA) is often used for the combination of HSDPA and EUL.

A retransmission scheme with both error correction and error detection is referred to as hybrid ARQ (Automatic Repeat-reQuest). Error corrections are enabled by combining information from both the first transmission of a data block and from subsequent retransmissions of the same data block. Furthermore, it is also possible to consider transmitting additional coded bits instead of repeating the same data block during a retransmission. To allow time for processing and signaling, several data blocks are handled in parallel. While data block i is processed and decoding information is fed back to the transmitter.

Random access in UTRAN is based upon slotted ALOHA. UE's in idle state monitors the system information of a base station within range to inform itself about candidate base stations in the service area etc. When a UE needs access to services, it sends a request over the random access channels (RACH) via the most suitable base station, typically the one with the most favorable radio conditions. Since the uplink propagation is only approximately known, the UE gradually increases the transmission power of a preamble until either it has been acknowledged via the Acquisition channel AICH, or the maximum number of attempts has been reached. Upon acknowledgement, the RACH message is sent. Reference is her made to 3GPP TS 25.214, Physical layer procedures (FDD) and 3GPP TS 25.211, Physical channels and mapping of transport channels onto physical channels (FDD). After admission control, the RNC initiates the connection via the most suitable base station if there are available resources. Uplink coverage is thus a necessity in order to successfully complete random access.

The UE can start the random-access transmission at the beginning of a number of well-defined time intervals, denoted access slots. There are 15 access slots per two radio frames and they are spaced 5120 chips apart, see FIG. 2. The timing of the access slots and the acquisition indication is described later. Information on what access slots that are available for random-access transmission is given by higher layers.

The structure of the random-access transmission (RACH Transmission) is shown in FIG. 3. The random-access transmission consists of one or several preambles of length 4096 chips and a message of length 10 ms or 20 ms.

Each preamble is of length 4096 chips and consists of 256 repetitions of a signature of length 16 chips. There are a maximum of 16 available signatures, see 3GPP TS 25.213: "Spreading and modulation (FDD)" for more details.

Before the physical random-access procedure can be initiated, Layer 1 shall receive the following information from the higher layers (RRC):

The preamble scrambling code.
The message length in time, either 10 or 20 ms.
The AICH_Transmission_Timing parameter [0 or 1].
The set of available signatures and the set of available RACH sub-channels for each Access Service Class (ASC).
The power-ramping factor Power Ramp Step [integer>0].

The parameter Preamble Retrans Max [integer>0].

The initial preamble power Preamble_Initial_Power.

The Power offset P p-m=Pmessage-control−Ppreamble, measured in dB, between the power of the last transmitted preamble and the control part of the random-access message.

The set of Transport Format parameters.

The physical random-access procedure shall be performed as follows (excluding signalling to higher layers).

1. The available uplink access slots are derived.
2. Randomly select a signature from the set of available signatures within the given ASC.
3. Set the Preamble Retransmission Counter to Preamble Retrans Max.
4. Calculate initial preamble power, considering the limited UE power.
5. Transmit a preamble using the selected uplink access slot, signature, and preamble transmission power.
6. If no positive or negative acquisition indicator (AI≠+1 nor −1) corresponding to the selected signature is detected in the downlink access slot corresponding to the selected uplink access slot:
    6.1. Select the next available access slot in the set of available RACH sub-channels within the given ASC.
    6.2. Randomly select a new signature from the set of available signatures within the given ASC.
    6.3. Increase preamble power by □P0=Power Ramp Step [dB].
    6.4. Decrease the Preamble Retransmission Counter by one.
    6.5. If the Preamble Retransmission Counter>0 then repeat from step 5. Otherwise exit the physical random access procedure.
    6.6. If a negative acquisition indicator is detected exit the physical random access procedure.
7. Transmit the random access message three or four uplink access slots after the uplink access slot of the last transmitted preamble depending on the AICH transmission timing parameter. Transmission control part power should be P p-m [dB] higher than the power of the last transmitted preamble.

The preamble detection mechanism in the Node B is based on received preamble correlation (can be interpreted as received energy) relative a preamble, which is configured from the RNC to the RBS over NBAP, see 3GPP TS 25.433, NBAP, UTRAN Iub interface NBAP signaling for further information. A too low threshold would mistakenly trigger preambles from thermal noise, and similarly, a too high threshold will trigger preambles at very high power levels, or miss preambles all together. The threshold may be set considering the worst case uplink load situation.

A RACH sub-channel defines a sub-set of the total set of uplink access slots. There are a total of 12 RACH sub-channels, essentially using one twelfth of the uplink slots each. FIG. 4 illustrates the access slots associated with the different sub-channels.

The set of allowed sub-channels are signaled from higher layers, depending on the UE access service class, see 3GPP TS 25.331, "Radio Resource Control (RRC)" for further information.

As described in 3GPP TS 25.211, "Physical channels and mapping of transport channels onto physical channels (FDD)" Section 7.3, the downlink AICH is divided into downlink access slots, and each access slot is of length 5120 chips. AICH access slots #0 starts the same time as P-CCPCH frames with (SFN modulo 2)=0. Similarly, the uplink PRACH is divided into uplink access slots, each access slot is of length 5120 chips. Uplink access slot number n is transmitted from the UE $\tau_{p-a}$ chips prior to the reception of downlink access slot number n, n=0, 1, . . . , 14.

Transmission of downlink acquisition indicators may only start at the beginning of a downlink access slot. Similarly, transmission of uplink RACH preambles and RACH message parts may only start at the beginning of an uplink access slot.

The PRACH/AICH timing relation is shown in FIG. 5.

The preamble-to-preamble distance $\tau_{p-p}$ shall be larger than or equal to the minimum preamble-to-preamble distance $\tau_{p-p,min}$, i.e. $\tau_{p-p} \geq \tau_{p-p,min}$.

In addition to $\tau_{p-p,min}$, the preamble-to-AI distance $\tau_{p-a}$ and preamble-to-message distance $\tau_{p-m}$ are defined as follows:
    when AICH_Transmission_Timing is set to 0, then
    $\tau_{p-p,min}$=15360 chips (3 access slots)
    $\tau_{p-a}$=7680 chips (1.5 access slots)
    $\tau_{p-m}$=15360 chips (3 access slots)
    when AICH_Transmission_Timing is set to 1, then
    $\tau_{p-p,min}$=20480 chips (4 access slots)
    $\tau_{p-a}$=12800 chips (2 access slots)
    $\tau_{p-m}$=20480 chips (4 access slots)

The parameter AICH_Transmission_Timing is signalled by higher layers.

FIG. 6 illustrates the available preambles for the first RACH preamble transmission relative the time of downlink access slot #0.

If the initial preamble transmission is not acknowledged over AICH, the UE selects a new access slots among the access slots associated to the allowed sub-channels, considering that the next preamble is at least either 3 or 4 access slots later, depending on the AICH_Transmission_Timing parameter.

For example, if the UE is allowed to use sub-channels 0-3, and $\tau_{p-p,min}$ corresponds to 3 access slots, then If the UE selected access slot #0 for the first preamble transmission, a possible preamble retransmission can take place in access slot #3.

If the UE selected access slot #1 for the first preamble transmission, a possible preamble retransmission can take place in access slot #12 at earliest.

In the 3GPP release 99, the RNC controls resources and user mobility. Resource control in this framework means admission control, congestion control, channel switching (roughly changing the data rate of a connection). Furthermore, a dedicated connection is carried over a dedicated channel DCH, which is realized as a DPCCH (Dedicated Physical Control Channel) and a DPDCH (Dedicated Physical Data Channel).

In the evolved 3G standards, the trend is to decentralize decision making, and in particular the control over the short term data rate of the user connection. The uplink data is then allocated to E-DCH, which is realized as the triplet: a DPCCH, which is continuous, an E-DPCCH for data control and an E-DPDCH for data. The two latter are only transmitted when there is uplink data to send. Hence the Node B uplink scheduler determines which transport formats each user can use over E-DPDCH. The RNC is however still responsible for admission control.

A data block is sent by the UE to the NodeB during a transmission time interval (TTI). For efficiency reasons, the received data blocks at the receiver are processed in parallel at M parallel processors taking turn to process data. While data block i is processed and decoding information is fed back to the transmitter, the receiver starts processing data blocks i, i+1, . . . etc. By the time when the receiver processor 1 has decoded the data block and fed back the decoding result, it is ready for processing either a retransmission of information related to the recently processed data or a new data block. By combining information both from the original data block and the retransmission, it is possible to correct errors in the reception. A retransmission scheme with both error correction and error detection is referred to hybrid ARQ. Therefore, the M processors are often referred to as HARQ processes, each handling a data block received in a TTI. FIG. 7 depicts parallel HARQ processors for M=8.

In the WCDMA uplink, there is a trade-off between coverage and enabled peak rates. This is even more emphasized with enhanced uplink, which supports higher bit rates than ordinary dedicated channels. The uplink resources are limited by the rise over thermal (RoT) that the cell can tolerate. The RoT limit is either motivated by coverage requirements or power control stability requirements. When only one user is connected in the cell, both power control stability and coverage are minor issues, since the uplink interference is likely to be dominated by the power generated by this user. In such a case it is tempting to allow a high RoT in order to allow high received signal relative interference powers, Ec/Io, which enables the use of high uplink bit rates. Conversely, in order to use the high uplink bit rates, the user connections have to provide high Ec/Io, which implies high RoT.

In order to orthogonalize the uplink user transmissions to a greater extent, it can be relevant to separate the user data transmissions in time, and employ a TDM (time division multiplex) scheme. It is possible to allocate grants to a user that is only valid for specified HARQ processes. This fact can be exploited to enable TDM for EUL. Furthermore, it allows retransmissions without interfering with other users, since retransmissions hit the same HARQ process as the original transmission. FIG. 8 provides some example resource allocations in a TDM setting.

In CELL_FACH, the UTRAN may redirect the UE to another frequency, see 3GPP TS 25.331, "Radio Resource Control (RRC)" for further information.

When in the CELL_FACH state, the UE autonomously selects carrier (in 3GPP specifications, referred to as cell reselection) and signals the selected carrier according to a specified "cell update" procedure, see 3GPP TS 25.331, "Radio Resource Control (RRC)" for further information, and FIG. 9 which illustrates UTRA RRC Connected mode cell reselection for URA_PCH, CELL_PCH, and CELL_FACH.

The cell reselection is essentially based on measurements of downlink signal quality of the common pilot channel (CPICH), which is broadcasted in each cell with a constant transmit power. More specifically, there are two options for quality metrics:

Energy per chip divided by the total received non-orthogonal interference power (Ec/N0) of the common pilot channel (CPICH).

Received signal code power (RSCP, i.e. signal strength) of the CPICH.

Which metric to employ is decided by the network and signalled on the broadcast channel (BCH).

The cell (re)-selection applies both to cells on the same carrier frequency, but also on other carrier frequencies.

As specified in 3GPP TS 25.304, "User Equipment (UE) procedures in idle mode and procedures for cell reselection in connected mode", the ranking of each cell is given by:

$Rs = Qmeas, s + Qhyst_s$ for the current cell and $Rn = Qmeas, n - Qoffset_{s,n}$ for the neighbouring intra/inter-frequency cells.

There are also other parameters involved, e.g. for priorities between cell layers which is useful for hierarchical cell structures, that are omitted here for the sake of clarity. See further 3GPP TS 25.304, "User Equipment (UE) procedures in idle mode and procedures for cell reselection in connected mode".

Observe that $Qoffset_{s,n}$ is an offset for the pair of cells and $Qhyst_s$ is a hysteresis margin employed for the current cell.

Dual-Carrier High-Speed Downlink Packet Access (DC-HSDPA, also known as Dual-Cell HSDPA) was introduced within the $3^{rd}$ Generation Partnership Project (3GPP) Rel-8. DC-HSDPA enables reception of data from two cells simultaneously, transmitted on two adjacent carriers in the same base station and sector, to individual terminals (or user equipments, UEs). The concept of DC-HSDPA is in 3GPP Rel-10, being extended to 4 downlink carrier frequencies (known as 4C-HSDPA).

To complement DC-HSDPA, in 3GPP Rel-9, Dual-Carrier High-Speed Uplink Packet Access (DC-HSUPA) was also introduced. DC-HSUPA enables an individual terminal to transmit data on two adjacent carrier frequencies simultaneously to the radio access network. DC-HSUPA according to 3GPP Rel-9 is in essence an aggregation of legacy (Rel-8, single-carrier) HSUPA.

Although the additional spectrum bandwidth associated with multi-carrier operation does not increase "spectral efficiency" (maximum achievable throughput per cell per Hz [bps/cell/Hz]), the experienced user data rates are increased significantly. In particular, for bursty packet data traffic at low and moderate load, the data rate is proportional to the number of carriers exploited. Moreover, power inefficient higher order modulation schemes can be avoided (which is especially important in the uplink) and the practical as well as theoretical peak data rate of the system are naturally increased.

In the discussion below the focus will be on the case of DC-HSUPA and 4C-HSDPA using contiguous carrier frequencies. However, all concepts are readily extendable to Multi-Carrier HSUPA (MC-HSUPA) operation over more than two uplink carriers, and system configurations wherein the carrier frequencies employed for the respective link direction are non-contiguous (e.g., in located in different frequency bands).

Handover and radio access bearer admission control is presumed to be conducted in the Radio Network Controller (RNC) based on measurements of path loss etc on a primary carrier (alternatively referred to as an anchor carrier). Notice though, that in case of a distributed RAN architecture where Node-B and RNC functionality as defined in 3GPP specifications are collocated in a base station, the base station would naturally handle also these functionalities. In a DC-HSUPA capable Node-B, the other carrier, which is referred to as a secondary carrier, is assumed to be configured by the RNC for a given DC-HSUPA capable UE and then scheduled and activated by Node-B whenever feasible and useful (with the standard objective function to maximize the supported traffic volumes, or aggregate system throughput, subject to fairness criteria and quality of service constraints, such as minimum bit rate or maximum latency requirements). A primary carrier, on the other hand, may not be temporarily deactivated by the Node-B: to deactivate a certain primary carrier for a connection, the connection is either released, or an inter-frequency handover is performed (in which case another carrier will become the primary carrier).

For each user connected in DC-HSUPA mode, the serving Node-B hence controls whether or not a secondary carrier is activated, and a separate grant is selected for each activated carrier.

Furthermore, if a secondary carrier is activated by Node-B, it is assumed that the Dedicated Physical Control Channel (DPCCH), which includes a sequence of pilot bits, is transmitted on that carrier, and the Node-B hence tries to detect this signal.

In a future system, one can envisage multi-carrier operations in the CELL_FACH state. A natural extension would then be to introduce a Node-B controlled carrier selection of the uplink transmissions and this will be presumed in certain embodiments of this invention.

Problems with existing solutions are summarized below.

Cells operating at high RoT will have limited coverage, and it might be impossible to successfully complete random access from some parts of the service areas. The RACH preamble will not be detected by the system at these high RoT when sent from parts of the service area. Furthermore, the gradual power increase may generate significant interference, which could have a negative impact on the data rate of the active user(s). Neither is it possible to lower the preamble because this will lead to many erroneous preamble detections from only thermal noise, which will give unnecessary Iub transmissions of subsequent RACH messages. Further, this will in many cases result in subsequent RACH transmissions at too low power levels, which will not be decoded correctly.

Moreover, the short time between a received preamble and when an acquisition indicator is expected means that it is very limited time for processing before it has to be determined whether a preamble was sent at a sufficient power level.

In the future operation at significantly higher RoT than today is anticipated in order to support high data throughput and many connected users in the cellular networks. The present RACH performance will then become a bottle-neck, making it impossible for terminals doing random access close to the cell edge to be detected by the base station. This situation will become even more troublesome when advanced interference suppressing receivers such as the G-rake+ are introduced. These receivers allow a higher RoT over the air-interface, making RACH performance even more critical. The solution to equip the RACH channel with these receivers as well, is only expected to provide a partial solution to the problem. It is e.g. non-trivial to determine the load after that IS gains have materialized for example for G-rake+ receivers allocated to RACH.

As a consequence another specific problem, associated with the present invention, is that signalling of RoT measured after advanced receivers like G-rake+ is not supported by the WCDMA standard. This limitation is at hand in the NBAP and RNSAP interfaces.

Still another specific problem is that the UE does base its carrier selection exclusively on the interference situation in the downlink—even in cases where e.g. measurements of uplink load would be available in the cellular system.

SUMMARY

In view of the discussion above, it is an object for embodiments herein to provide improved methods and arrangements for handling carrier selection for performing random access.

In accordance with one aspect a method is provided for handling carrier selection. According to the method at least one of interference or load levels are measured on at least two uplink carriers, the measurement being performed in at least one sector of each carrier. An offset based on the measured interference or the measured load levels on the at least two uplink carriers is calculated, wherein the offset reflects the interference or load difference between the uplink carriers. The offset is signalled to a communication device, thereby allowing the communication device to base its carrier selection for random access at least on the measured interference or load levels on the at least two uplink carriers. This method is preferably implemented in at least one radio network node, comprising e.g. a base station, and optionally a radio network controller. The carrier selection is made in the communication device.

The communication device may be any kind of device communicating with the radio network node such as e.g. a mobile phone, a computer, a tablet computer, an e-book reader, or a machine for machine-to-machine applications such as e.g., a vending machine, a sensor, a traffic monitor, or similar.

If interference levels are measured, they may be any of received total wideband power, neighbour cell interference, own cell interference, or thermal noise levels, and if load levels are measured, they may be any of noise rise or rise over Thermal (RoT) levels. Also, the carrier selection for random access can be based on any two or more of these different parameters as measured on the uplink carriers.

The interference or load levels on the at least two uplink carriers are advantageously measured continuously. However, if the interference or load levels on the at least two uplink carriers are varying in time, preferably in a cyclic known manner, random access slots associated to time periods, during which the interference or load levels on the at least two uplink carriers are lower, are announced, and the measurements of the interference or load levels on the at least two uplink carriers are performed during these time periods only. Hereby, random access is steered towards times when the interference or load levels are low.

The measured interference or load levels on the at least two uplink carriers may be filtered before the offset is calculated. For instance, a low pass filter may be applied in order to smooth the measured interference or load levels to obtain a more reliable measure of the offset.

If the receiver used in the step of measuring the interference or load levels on the at least two uplink carriers comprises interference suppressing (IS) capabilities, the measured interference or load levels on the at least two uplink carriers or the calculated offset are/is compensated for such interference suppression.

Similarly, if the receiver used in the step of measuring the interference or load levels on the at least two uplink carriers comprises interference cancellation (IC) capabilities, the measured interference or load levels on the at least two uplink carriers or the calculated offset are/is compensated for such interference cancellation.

Yet further, an identification of the receiver type used in the measurements and/or an identification of a mapping between the at least two uplink carriers and corresponding downlink carriers may, in addition to the calculated offset, be signalled to the communication device.

In one embodiment, the radio network node and the communication device are provided with multi-carrier communication capabilities, such as DC-HSDPA (Dual-Carrier High-Speed Downlink Packet Access) and DC-HSUPA (Dual-Carrier High-Speed Uplink Packet Access). The calculated offset, and optionally the above identification of the receiver type and/or mapping between the at least two uplink carriers and corresponding downlink carriers, is/are signalled to the communication device via Layer 1 or Layer 2 signalling.

In another embodiment, the calculated offset, and optionally the above identification of the receiver type and/or mapping between the at least two uplink carriers and corresponding downlink carriers, is/are signalled to the communication device over at least one of NBAP (Node B Application Part) or RNSAP (Radio Network Subsystem Application Part).

If being in CELL_FACH state, the at least two uplink carriers, on which the interference or load levels are measured, are selected as a subset of available uplink carriers.

In accordance with another aspect a method is provided for handling carrier selection. According to the method an offset calculated based on measured interference or load levels on at least two uplink carriers in at least one sector of each of the carriers, is received from a radio network node, wherein the offset reflects at least one of the interference or load difference between the at least two uplink carriers. The carrier selection for random access is performed based at least on the received offset. Preferably, this method is implemented in a communication device, such as e.g. a device of the above identified kind.

The uplink carrier having the lowest measured interference or load levels can be selected for random access.

Preferably, an identification of the receiver type used in the measurement of the interference or load levels on the at least two uplink carriers and/or an identification of the mapping between the at least two uplink carriers and corresponding downlink carriers are/is received, and the carrier selection is performed based on the identification of the receiver type and/or the identification of the mapping.

In accordance with yet another aspect a radio network arrangement for handling carrier selection is provided. The radio network arrangement comprises means provided for measuring interference or load levels on at least two uplink carriers, wherein the measurements are performed in at least one sector of each carrier. Means are provided for calculating an offset based on the measured interference or load levels on the at least two uplink carriers, wherein the offset reflects the interference or load difference between the at least two uplink carriers. Finally, means are provided for signalling the offset to a communication device, thereby allowing the communication device to base its carrier selection for random access also on the interference or load levels on the at least two uplink carriers. The radio network arrangement may be implemented in a radio network node such as a base station or a radio network controller, or it may be implemented in more than one node in a distributed manner, such as in a base station and a radio network controller. For instance, in multi-carrier selection, all of the above means may be implemented in the base station and the signalling of the offset to the communication device may be performed as Layer 1 or Layer 2 signalling. Alternatively, the offset is signalled to the communication device via the radio network controller over NBAP and/or RNSAP. In general carrier selection, the measuring means may be implemented in the base station, whereas the calculating means and the signalling means may be implemented in the radio network controller, wherein the radio network controller may signal the calculated offset, and optionally the identification of the receiver type used in the measurement of the interference or load levels on the uplink carriers and/or the identification of the mapping between the uplink carriers and corresponding downlink carriers to the communication device over NBAP and/or RNSAP.

In accordance with still another aspect a communication device for handling carrier selection comprises means provided for receiving from a radio network node an offset calculated based on measured interference or load levels on at least two uplink carriers in at least one sector of each of the carriers, wherein the offset reflects the interference or load difference between the at least two uplink carriers; and means provided for performing carrier selection for random access based also on the interference or load levels on the uplink carriers.

By the present invention, the carrier selection is made dependent on the uplink interference or load of the available uplink carriers. This mechanism hence provides means to direct the communication devices to an uplink carrier with the lowest interference or load for random access. This enhances the likelihood of successful random access and reduces the problems with RACH sensitivity in high load situations.

Another advantage is that the need for "clean" carrier solutions putting e.g. RACH on a separate carrier is avoided, making better use of the available resources.

BRIEF DESCRIPTION OF THE DRAWINGS

FIG. 4 is a table illustrating the available uplink access slots for different RACH sub-channels.

DETAILED DESCRIPTION

Embodiments herein may be exemplified in the following non-limiting detailed description.

Figure 1:
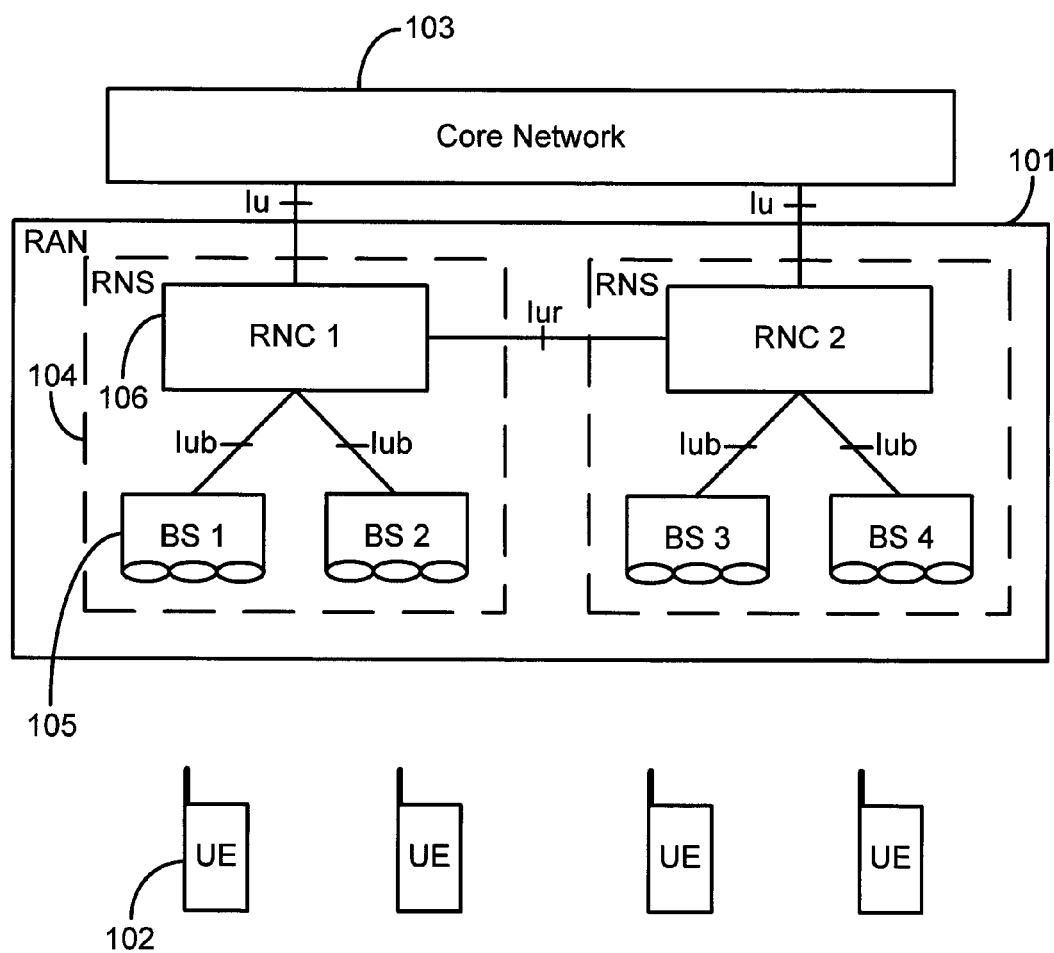
FIG. 1 is a schematic block diagram illustrating the architecture of a Radio Access Network.
Figure 2:
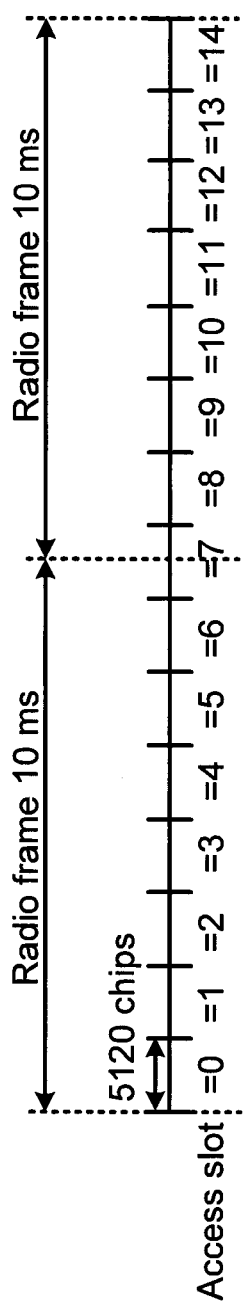
FIG. 2 illustrates PRACH access slots.
Figure 3:
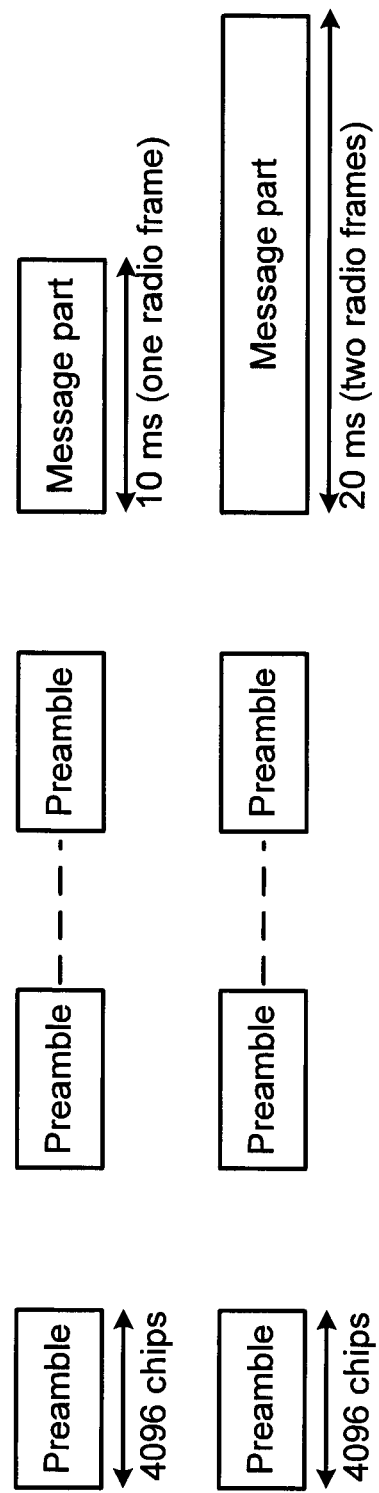
FIG. 3 illustrates the structure of a random-access transmission (RACH transmission) with one or several preambles and upon acquisition, a message part of either 10 or 20 ms.
Figure 5:
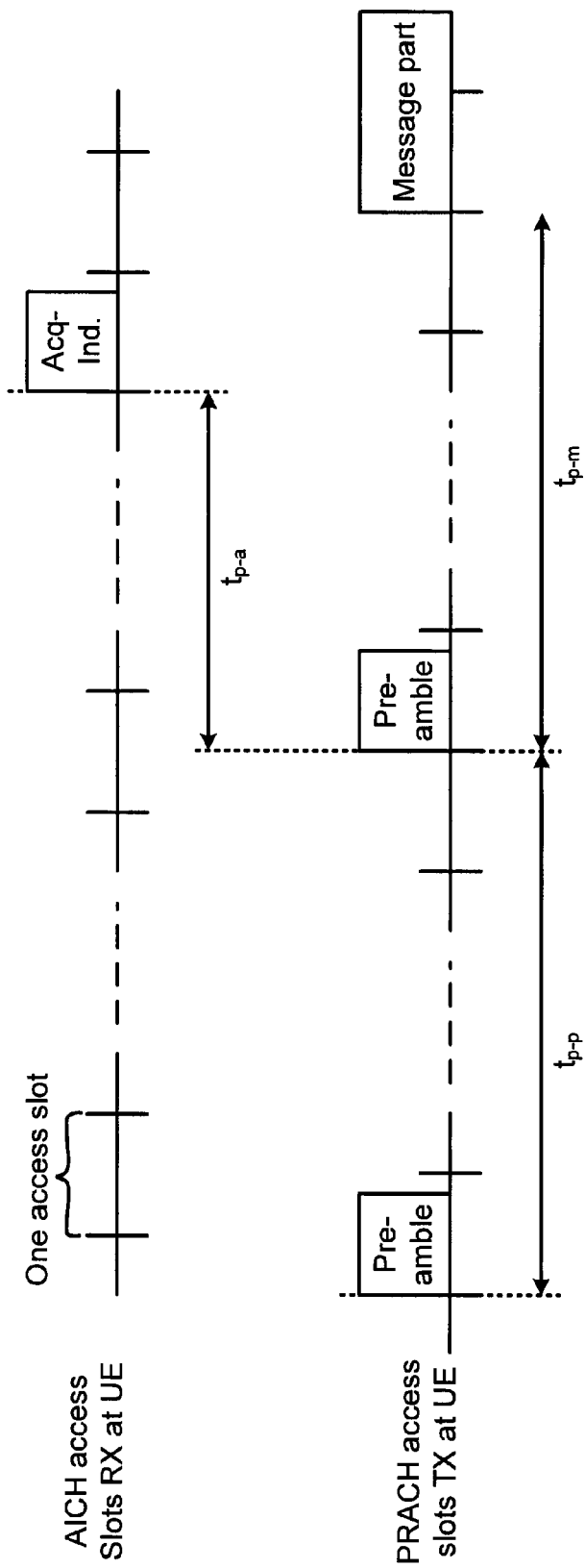
FIG. 5 illustrates the timing relation between PRACH and AICH as seen at the UE.
Figure 6:
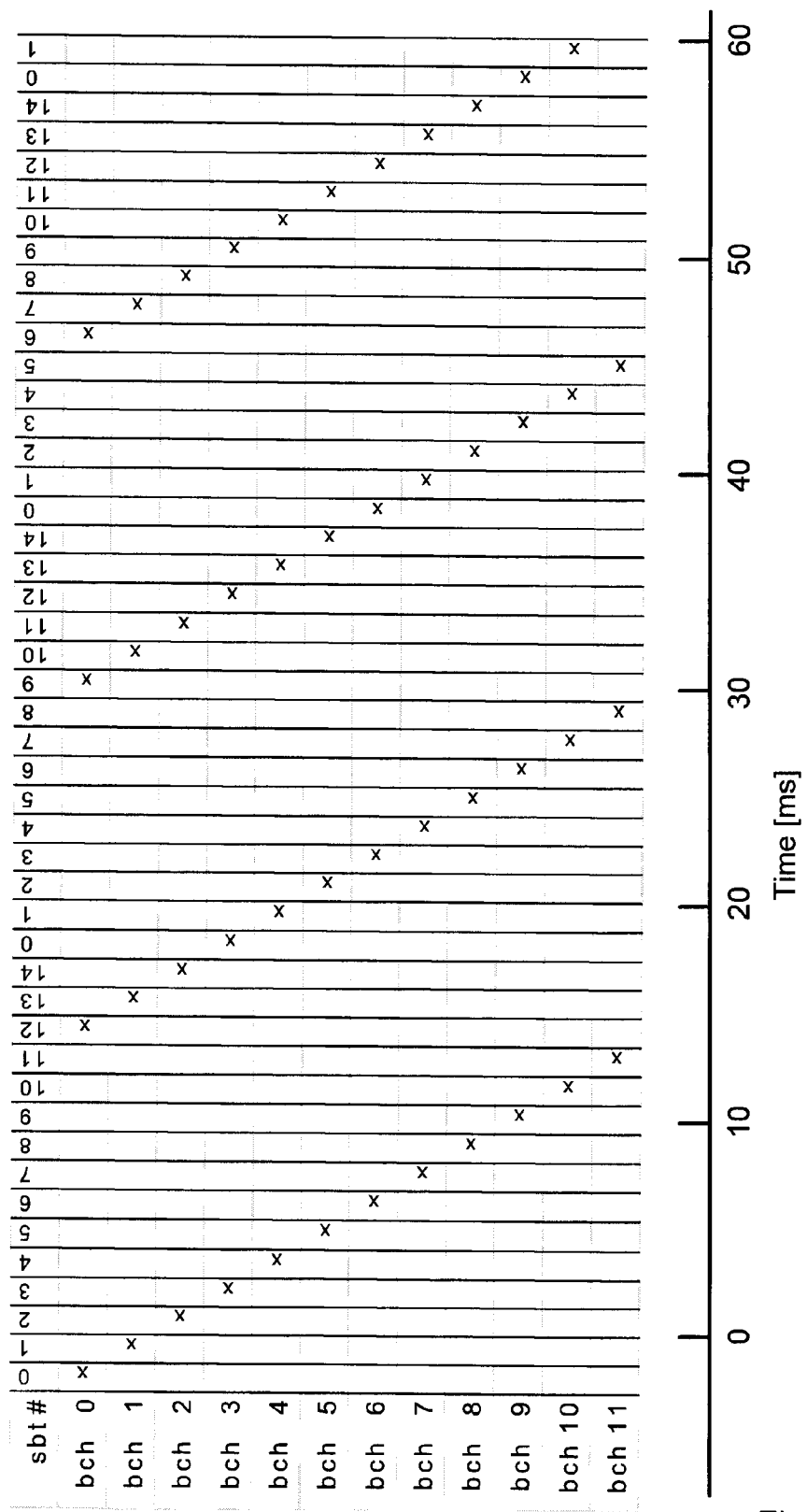
FIG. 6 illustrates the available preambles for the first RACH preamble transmission relative the time of downlink access slot #0, i.e. RACH access slots per sub-channel available for the first RACH preamble transmission versus time. P-CCPCH SFN module 8=0 is the time reference represented as 0 on the x-axis.
Figure 7:
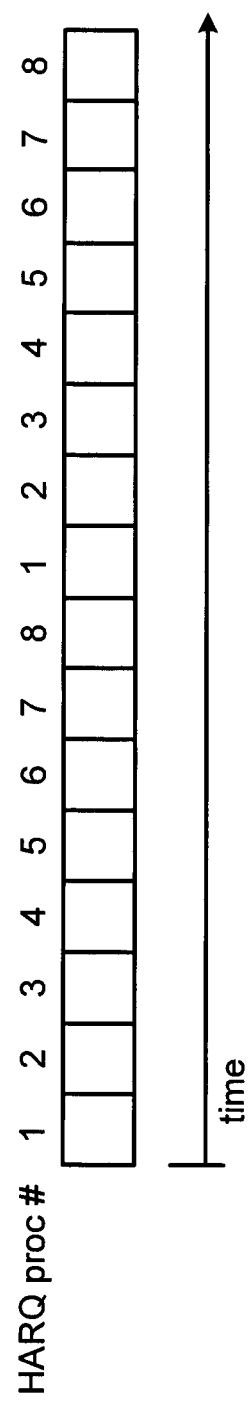
FIG. 7 depicts parallel HARQ processors for M=8.
Figure 8:
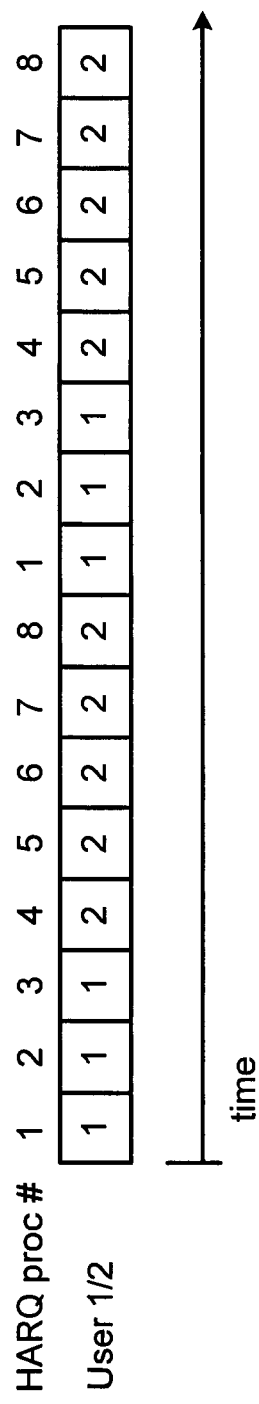
FIG. 8 provides some example resource allocations in a TDM setting for a TDM scheme where two users that share the resource are separated in time.
Figure 9:
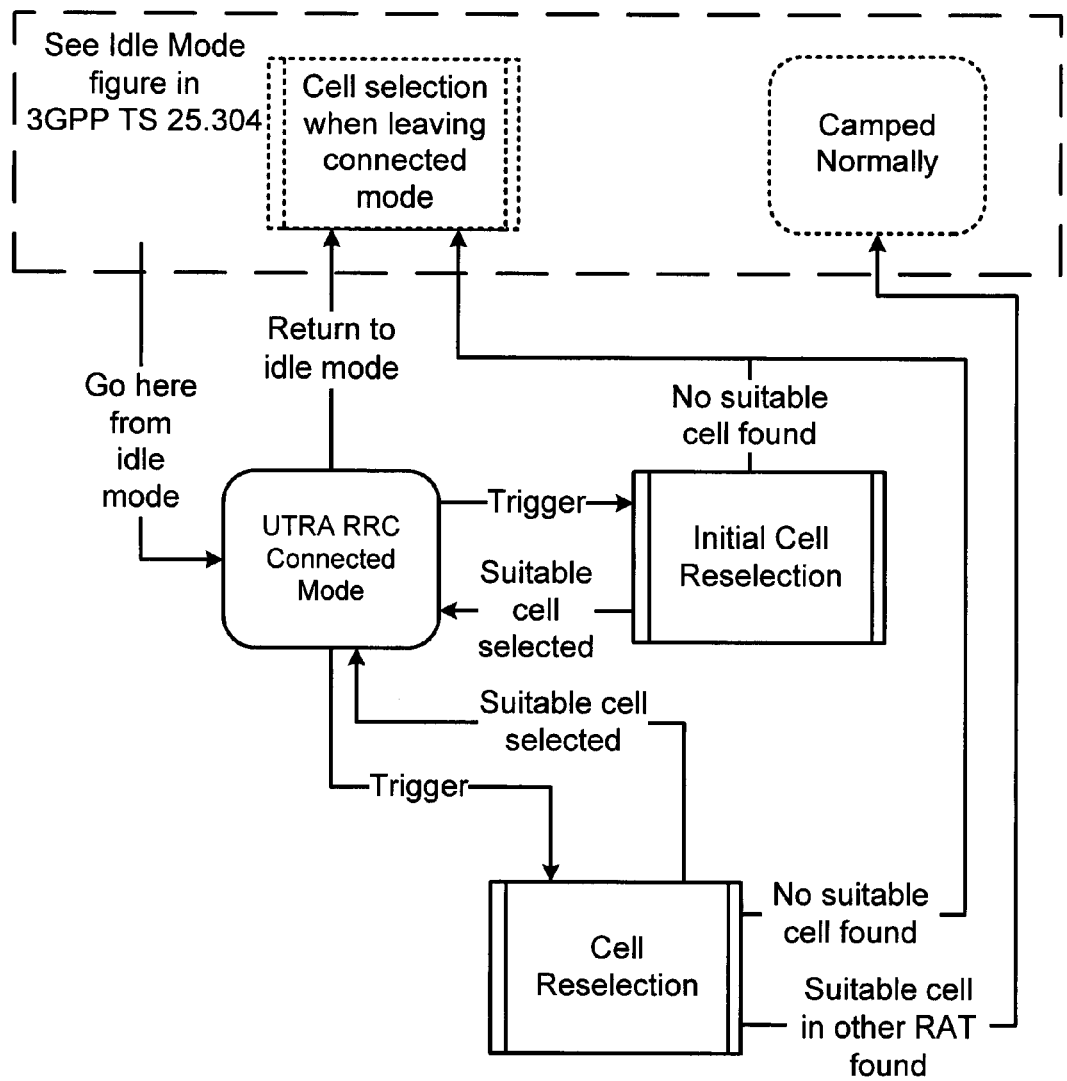
FIG. 9 illustrates UTRA RRC Connected mode cell reselection for URA_PCH, CELL_PCH, and CELL_FACH.
Figure 10:
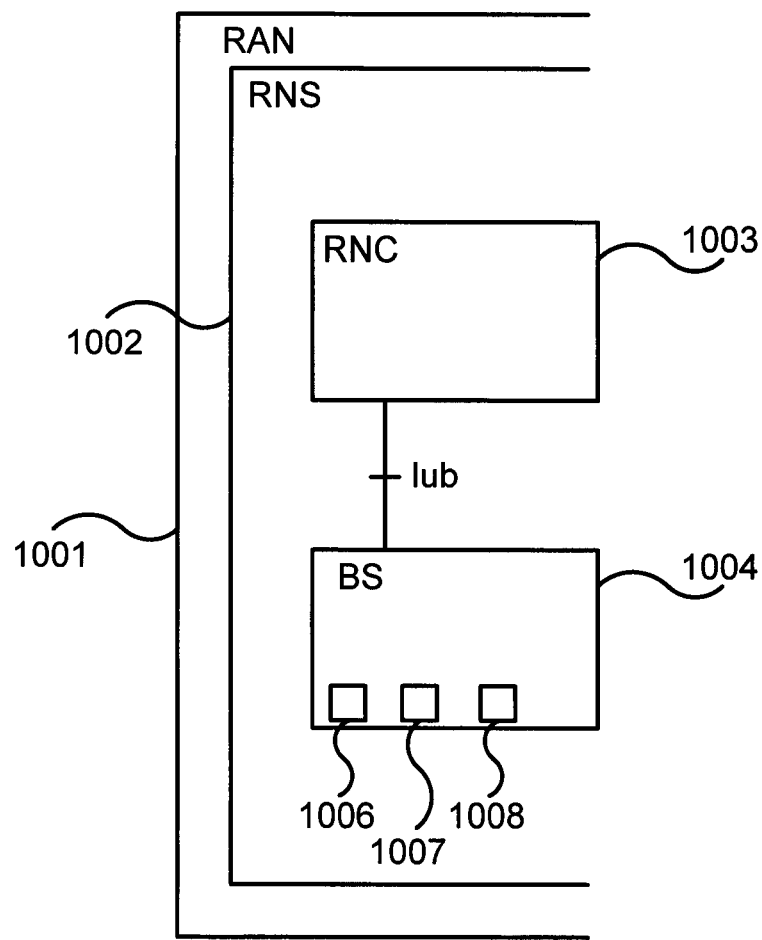
FIG. 10 is a schematic block diagram of portions of a radio access network and user equipment in which an embodiment of the invention is implemented.

FIG. 10 is a schematic block diagram of portions of a radio access network and user equipment in which an embodiment of the invention is implemented. The radio access network (RAN) 1001 may comprise a plurality of radio network subsystems (RNS) 1002, each RNS 1002 may comprise a radio network controller (RNC) 1003 and a plurality of base stations (BS) 1004 connected to the RNC 1003 via Iub interfaces. A communication device or user equipment (UE) is denoted by 1005. While the communication devices will be referred to as a UE below, it shall be appreciated that the invention is applicable to a large variety of communication devices such as mobile phones, computers, tablet computers, e-book readers, and machines for machine-to-machine applications such as e.g., vending machines, sensors, traffic monitors, or similar.

The BS 1004 and the UE 1005 are provided with multi-carrier communication capabilities, such as DC-HSDPA (Dual-Carrier High-Speed Downlink Packet Access) and DC-HSUPA (Dual-Carrier High-Speed Uplink Packet Access), for an envisaged multi-carrier CELL_FACH.

A radio network arrangement 1006-1008 and a UE arrangement 1009-1010 for carrier handling for random access according to embodiments of the invention are implemented in the RAN 1001 and the UE 1005, respectively.

The radio network arrangement 1006-1008, which is entirely implemented in the BS 1004 in the embodiment of FIG. 10, comprises generally means 1006 provided for measuring interference or load levels on at least two uplink carriers, wherein the measurements are performed in at least one sector of each carrier, means 1007 provided for calculating an offset based on the measured interference or load levels on the uplink carriers, wherein the offset reflects the interference or load difference between the uplink carriers, and means 1008 provided for signalling the calculated offset to the UE 1005, thereby allowing the UE to base its carrier selection for random access at least on the interference or load levels on the uplink carriers.

Similarly, the UE arrangement 1009-1010, which is implemented in the UE 1005, comprises generally means 1009 provided for receiving from the radio network arrangement the offset calculated based on measured interference or load levels on the uplink carriers in at least one sector of each of the carriers, and means 1010 provided for performing carrier selection for random access based at least on the interference or load levels on the uplink carriers.

The measuring means 1006 may be comprised of a receiver and a processor with suitable software, the calculating means 1007 may be comprised of a or said processor with suitable software, and the signaling means 1008 may be comprised of a or said processor with suitable software and a transmitter. The receiving means 1009 may be comprised of a receiver and the means for performing carrier selection 1010 may be comprised of a processor with suitable software and a transmitter.

Preferably, the interference or load levels on the uplink carriers are measured continuously or repeatedly.

If the receiver used in the step of measuring the interference or load levels on the uplink carriers comprises interference suppressing (IS) capabilities, the measured interference or load levels on the at least two uplink carriers or the calculated offset may or may not be compensated for such interference suppression.

Similarly, if the receiver used in the step of measuring the interference or load levels on the at least two uplink carriers comprises interference cancellation (IC) capabilities, the measured interference or load levels on the at least two uplink carriers or the calculated offset may or may not be compensated for such interference cancellation.

The measured interference or load levels on the uplink carriers may be filtered before the offset is calculated in order to smooth out the measured interference or load levels and to thereby provide a better accuracy and precision in the calculated offset.

The calculated offset and optionally an identification of how the uplink carriers are mapped to corresponding downlink carriers may be signalled from the BS 1004 directly to the UE 1005 via Layer 1 or Layer 2 signalling. Alternatively, the signalling is made via the RNC 1003 over at least one of NBAP (Node B Application Part) or RNSAP (Radio Network Subsystem Application Part).

The uplink carriers, on which the interference or load levels are measured, may be selected as a subset of available uplink carriers when being in CELL_FACH state.

The interference or load levels on the uplink carriers that are measured may be any of received total wideband power, neighbour cell interference, own cell interference, thermal noise, noise rise, or rise over Thermal (RoT) levels.

Figure 11:
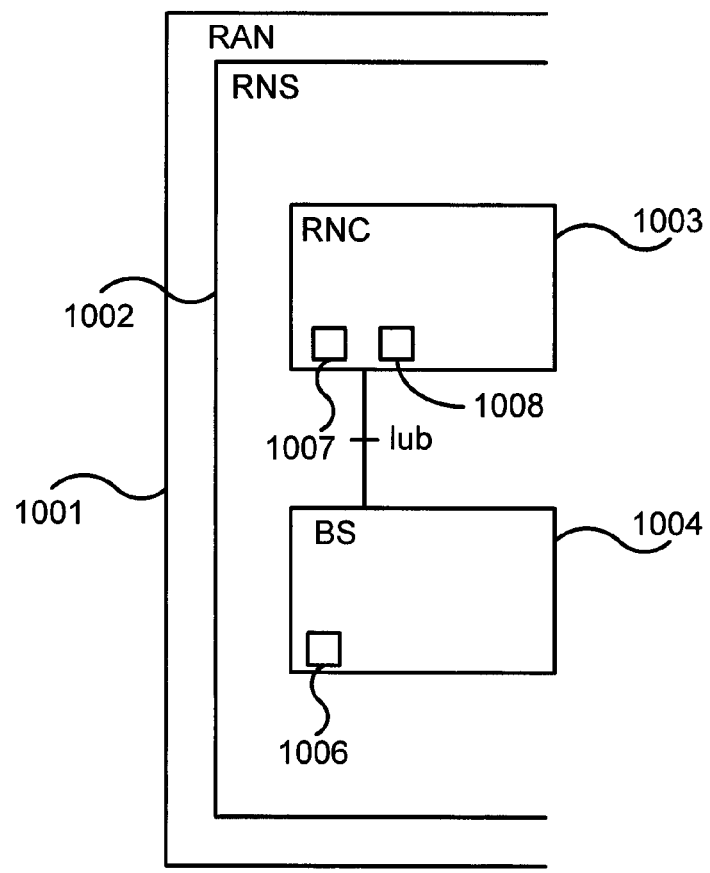
FIG. 11 is a schematic block diagram of portions of a radio access network and user equipment in which an alternative embodiment of the invention is implemented.

FIG. 11 is a schematic block diagram of portions of a radio access network and a user equipment in which an alternative embodiment of the invention is implemented.

This embodiment differs from the embodiment of FIG. 10 in that the radio network subsystem 1002 and the UE 1005 are set up for general carrier selection. To this end, the calculating means 1007 and the signalling means 1008 are implemented in the RNC 1003 instead for in the BS 1004.

Further, the signalling means 1007 is provided for signalling the calculated offset, and optionally an identification of the receiver type used in the measurements and/or an identification of how the uplink carriers are mapped to corresponding downlink carriers, to the UE 1005 over NBAP and/or RNSAP.

Further, common for both the multi-carrier selection and general carrier selection embodiments, in a special case, wherein the interference or load levels such as e.g. the RoT target for the radio resource management of a carrier, is varying in a cyclic manner, and random access attempts can be steered towards the time periods when the RoT target is low. This is accomplished by announcing random access slots associated to the time periods of low RoT target. In this case, the possibly filtered RoT measurements shall reflect the time periods with low RoT targets.

Figure 12:
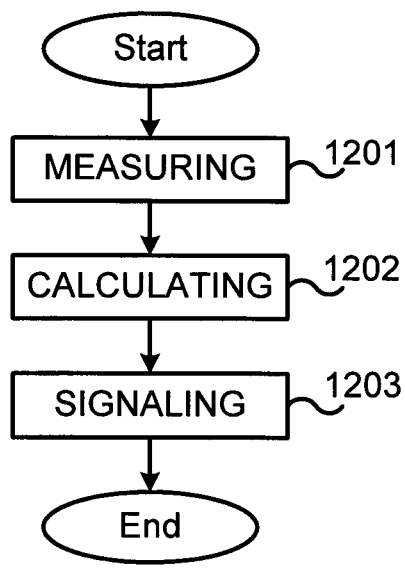
FIG. 12 is a flow diagram of a method for handling carrier selection according to a further embodiment of the invention.

FIG. 12 is a flow diagram of a method for handling carrier selection according to a further embodiment of the invention. The method may be implemented in at least one radio network node. At least one of interference or load levels on at least two uplink carriers is, in a step 1201, measured. The measurements are performed in at least one sector of each carrier. An offset is, in a step 1202, calculated based on the measured interference or load levels on the uplink carrier. The offset reflects the interference or load difference between the uplink carriers. Finally, the offset is, in a step 1203, signalled to a communication device or user equipment. Hereby, the communication device can base its carrier selection for random access at least on the measured interference or load levels on the uplink carriers.

The method illustrated in FIG. 12 may incorporate steps for performing any of the functions performed in a radio network node disclosed above with reference to FIGS. 10 and 11 as well as those disclosed below in this description.

Figure 13:
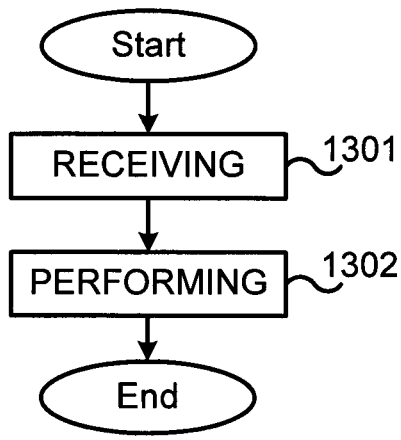
FIG. 13 is a flow diagram of a method for handling carrier selection according to a yet further embodiment of the invention.

FIG. 13 is a flow diagram of a method for handling carrier selection according to a yet further embodiment of the invention. The method may be implemented in communication device or user equipment. An offset calculated based on measured interference or load levels on at least two uplink carriers in at least one sector of each of the carriers is, in a step 1301, received from a radio network node, such as e.g. a base station or a radio network controller: The offset reflects at least one of the interference or load difference between the uplink carriers. Finally, carrier selection for random access is, in a step 1302, performed based at least on the received offset. Hereby, the communication device can base its carrier selection for random access at least on the measured interference or load levels on the uplink carriers.

The method illustrated in FIG. 13 may incorporate steps for performing any of the functions performed in a communication device or user equipment disclosed above with reference to FIGS. 10 and 11 as well as those disclosed below in this description.

There are several advantages with the present invention.

Accounting for the uplink RoT or other interference or load values on different carriers will improve random access success probability at high uplink load. This is crucial to make full use of the large investments in new BSs, e.g. to enable new advanced G-rake+ receivers, or IC receivers.

By the use of dynamically adjusted offsets depending on the uplink load on different carriers in the carrier selection to direct random accesses to the best uplink carrier dynamically, "clean" carrier solutions to solve the RACH sensitivity problem are avoided. This avoids fixed restrictions in terms of carrier usage, giving a better utilization of available resources.

The remaining sections of the detailed description are organized as follows. First, there is a general section regarding advanced receivers, uplink load estimation and signalling that can be used when implementing the invention. The following section is devoted to details regarding measurement and filtering of RoT in the base station. Thereafter, there is a section disclosing how the offset is computed in the base station. Then there is a section on signalling of the computed offset from the base station to the user equipment for multi-carrier selection. This section is followed by short sections regarding compensation for uplink load and multi-carrier selection in the user equipment, signalling of filtered load related quantities over NBAP and RNSAP for radio network controller carrier selection, computation of offset in the radio network controller, signalling of offset from the radio network controller, and time varying RoT targets.

Advanced Receivers, Uplink Load Estimation and Signalling

Load estimation in the WCDMA uplink is performed for many reasons in prior art. Most importantly, the present scheduling of enhanced uplink traffic is based on the principle to schedule users until a load threshold is reached. Such scheduling decisions are taken every 2/10 ms transmission time interval (TTI). The scheduling is typically used in order to maintain a planned coverage, and to maintain cell stability avoiding inner loop power control (ILPC) power rushes. When coverage is addressed neighbour cell interference is incorporated in the load measure, this is not the case when cell stability is treated. The scheduling and load estimation functionality and algorithms are both located in the WCDMA RBS.

It is also possible to use the estimated uplink load in load based admission control algorithms. Also this is known in prior art. These algorithms use the uplink load in order to determine if new users can be admitted in specific cells. The admission control functionality is located in the RNC node. Signalling means for signalling of load is available over the NBAP interface, see 3GPP TS 25.433, "NBAP, UTRAN Iub interface NBAP signaling" for further information.

Herein, the load measure that is relevant for coverage is of interest. This load measure is given by various versions of the rise over thermal (RoT).

It is well known in the art that without advanced interference suppressing (IS) receivers and interference cancellation (IC), the load defined at the antenna connector is given by the noise rise, or rise over thermal, RoT(t), defined by $$RoT(t) = \frac{RTWP(t)}{N},$$

where N is the thermal noise level as measured at the antenna connector. The definition of RTWP(t) is the total wideband power $$RTWP(t) = \sum_{u=1}^{U} P_u(t) + I(t) + N,$$

also measured at the antenna connector. Here $P_u(t)$, $u=1, \ldots, U$, denotes the power of uplink user u, and $I(t)$ denotes the power as received from neighbour cells of the WCDMA system.

A problem that now needs to be addressed is that the signal reference points are, by definition at the antenna connector. The measurements are however obtained after the analogue signal conditioning chain, in the digital receiver. The analogue signal conditioning chain may unfortunately introduce a scale factor error of about 1-3 dB. Fortunately, all powers of the cell are almost equally affected by the scale factor error so when the RoT is calculated, the scale factor error is cancelled as $$RoT^{Digital\ Receiver}(t) = \frac{RTWP^{Digital\ Receiver}(t)}{N^{Digital\ Receiver}(t)}$$
$$= \frac{\gamma(t) RTWP^{Antenna}(t)}{\gamma(t) N^{Antenna}(t)}$$
$$= RoT^{Antenna}(t).$$

The RoT can hence be measured in the receiver. The major difficulty of any RoT estimation algorithm still remains though, namely to separate the thermal noise power from the interference from neighbour cells. That this is troublesome cane be seen from the following equation, where E[ ] denotes statistical expectation, and where $\Delta$ denotes the variation around the mean.

$$I^N(t)+N(t)=E[I^N(t)]+E[N(t)]+\Delta I^N(t)+\Delta N(t),$$

The fundamental problem can now be clearly seen. Since there are no measurements available in the BS that are related to the neighbour cell interference, a linear filtering operation can at best estimate the sum $E[I^N(t)]+E[N(t)]$. This estimate cannot be used to deduce the value of $E[N(t)]$. The situation is the same as when the sum of two numbers is available. Then there is no way to figure out the values of the individual numbers. This issue is analysed rigorously for the RoT estimation problem in the following publication, T. Wigren, "Soft uplink load estimation in WCDMA", *IEEE Trans Veh. Tech.*, February, 2009, where it is proved that the noise power floor is not mathematically observable. Nonlinear algorithms that provide approximate estimates of the noise floor are therefore used.

Figure 14:
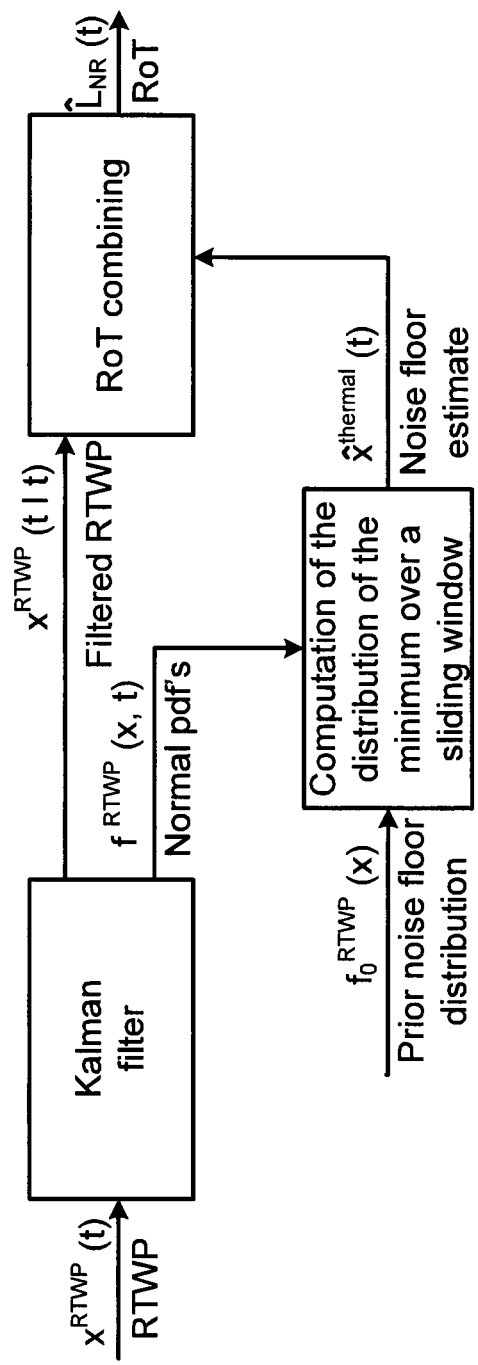
FIG. 14 illustrates a block diagram of one embodiment of a RoT estimation algorithm.

The RoT estimation algorithm currently in use is depicted in FIG. 14. The algorithm estimates the RoT. The main problem solved by the estimation algorithm is the accurate estimation of the thermal noise floor N. Since it is not possible to obtain exact estimates of this quantity due to the neighbour cell interference, the estimator therefore applies an approximation, by consideration of the soft minimum as computed over a relative long window in time.

It is important to understand that this estimation relies on the fact that the noise floor is constant over very long periods of time (disregarding the small temperature drift).

FIG. 14 illustrates a block diagram of the current RoT estimation algorithm.

The sliding window algorithm of the above section has the disadvantage of requiring a large amount of storage memory. This becomes particularly troublesome in case a large number of instances of the algorithm are needed, as may be the case when IC is introduced in the uplink.

To reduce the memory consumption a recursive algorithm was disclosed in WO2008039123 and is incorporated herein by reference. That algorithm reduces the memory requirements of the sliding window scheme discussed above at least by a factor of 100.

The invention disclosed here is applicable both to the sliding window RoT estimation algorithm and the recursive algorithm of WO2008039123.

The difference with G-rake+ as compared to conventional RAKE, is that each user sees a reduced level of interference, immediately after the so called weight combining step. In G-rake+, a covariance matrix $\hat{R}_u$, $u=1, \ldots, U$, with the order equal to the number of fingers is first estimated to capture the interference. The codes not used by the present user u may be used in order to estimate $\hat{R}_u$.

The GRAKE+ receiver uses the estimated covariance matrix that models the interference for computation of the combining weights for the users u, $u=1, \ldots, U$.

$$\hat{R}_u \hat{w}_u = \hat{h}_u, u=1, \ldots, U$$

where $\hat{h}_u$, $u=1, \ldots, U$, is the net channel response of user u and where $\hat{w}_u$ are the combining weights.

The effect of the above equation is that GRAKE+ essentially whitens the correlated interference and removes large spectral peaks from interferers at certain finger locations and for certain antenna elements.

Figure 15:
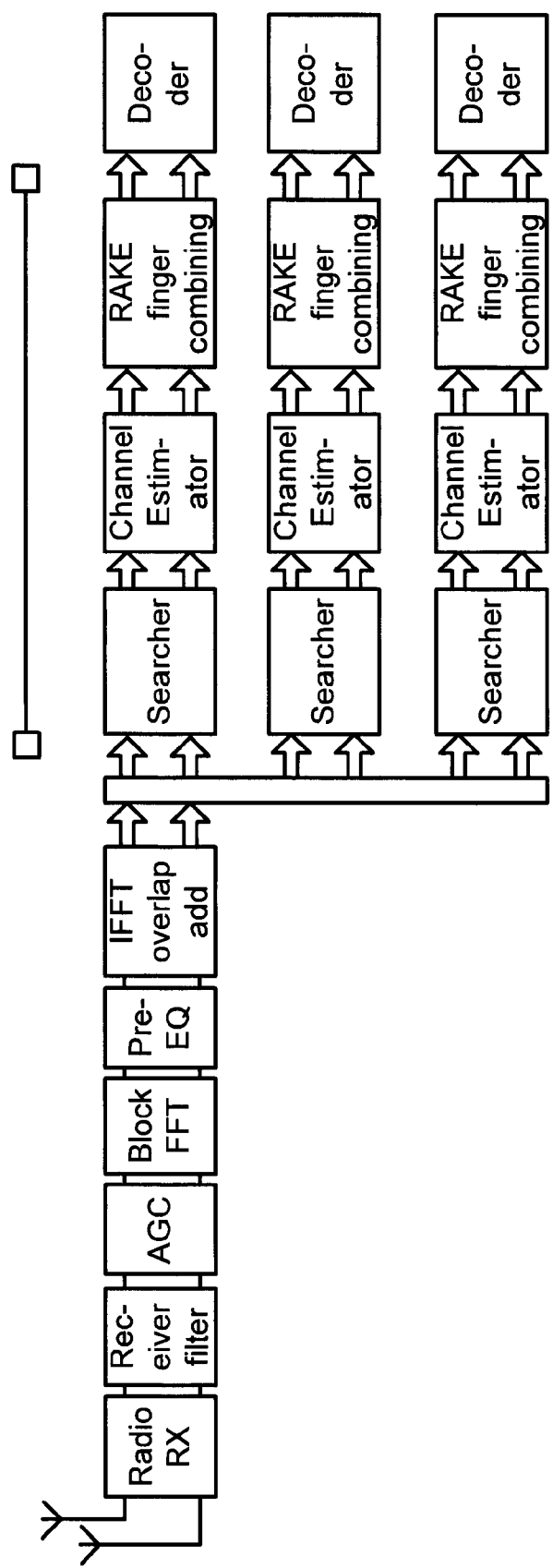
FIG. 15 illustrates the FDPE receiver structure.

The Frequency Domain Pre Equalizing (FDPE) receiver is another interference suppressing receiver. It is relevant here since it too affects the measurement of uplink load. The FDPE receiver structure is depicted in FIG. 15. The three blocks, BLOCK FFT, Pre-EQ and IFFT Overlap-add, are added to the existing uplink WCDMA receiver structure without IS. The main advantages associated with this structure are claimed to be The FDPE structure gives significant IS gains.

The FDPE structure achieves IS for all users simultaneously, thereby reducing the computational complexity as compared to the G-rake+ structure that performs processing individually for all users.

Processing blocks are inserted in the uplink receiver structure that is already in place—thereby reducing development costs.

The fast Fourier transform (FFT) accelerator hardware developed for LTE can be reused, thereby creating further synergies for new DUS of the RBS.

The FDPE algorithm performs interference whitening in the frequency domain. To explain this in detail, the following time domain signal model can be used $$v(t) = \sum_{l=0}^{L-1} h(l) z(t-l) + \eta_v(t).$$

Here v is the received (vector due to multiple antennas) signal, with chip sampling rate, h is the radio channel net response, z is the desired (transmitted) signal and $\eta_v$ denotes thermal noise and interference. t denotes discrete time.

Taking the Fourier transform, translates the time domain equation into $$V(m) = H(m) Z(m) + N(m)$$

where the quantities are the discrete Fourier transform of the corresponding time domain quantities. Now a whitening filter can be applied in the frequency domain. It is well known that the filter that minimizes the mean square error (the MMSE solution) is given by $$W_{MMSE}(m) = \left(\hat{R}_d(m)\right)^{-1} \hat{H}(m)$$

$$= \left(\begin{bmatrix} R_{0,0}(m) & R_{0,1}(m) & \ldots & R_{0,N_y-1}(m) \\ R_{1,0}(m) & R_{1,1}(m) & & \\ \vdots & & \ddots & \\ R_{N_y-1,0} & & & R_{N_y-1,N_y-1}(m) \end{bmatrix}\right)^{-1} \begin{bmatrix} \hat{H}_0(m) \\ \hat{H}_1(m) \\ \vdots \\ \hat{H}_{N_y-1}(m) \end{bmatrix}$$

Note that GRAKE+ is still a linear receiver. There is a related type of IC receiver for WCDMA which is also linear, denoted the chip equalizer. The difference between GRAKE+ and the chip equalizer is simply the order of certain basic operations. The consequence is that the present invention is most likely applicable to the chip equalizer as well. It is stressed that a patent application needs to cover up for this.

WO2010144004 discloses means for estimation of the RoT, as seen by a user after G-rake+. The document WO2010144004 defines a new signal after G-rake+ processing and evaluates RoT for that signal.

However, the algorithm WO2010144004 requires inversion of the impairment matrix of each user and is too computationally demanding to be preferred presently.

where $\hat{R}_d(m)$ is an estimate of the covariance matrix of V(m). Using a Cholesky decomposition the covariance matrix between the antenna elements can be factored as $$L(m) \cdot L^H(m) = \hat{R}_d(m)$$

The idea behind FDPE is to exploit this factorization and write $$W_{MMSE}(m) = (L^H(m))^{-1}((L(m))^{-1} \hat{H}(m)) = W_{pre}(m)((L(m))^{-1} \hat{H}(m))$$

so that the desired signal in the frequency domain becomes MMSE pre-equalized in the frequency domain, i.e. given by $$Z_{pre}(m) = W_{pre}(m) V(m)$$

This is a user independent processing, which is the same for all users. Hence the wideband received signal is transformed to the frequency domain and the covariance matrix is computed and Cholesky factored, after which the whitened signal is computed. The signal is then transformed back to the time domain where it is further processed for each user. Note that the channels experienced by the RAKE receivers in this processing are obtained from the second factor of the above equation.

The FDE algorithm performs equalization and interference suppression in the frequency domain. Contrary top the FDPE, the FDE processing is performed individually for each user. To explain the FDE in, the following time domain signal model is used again $$v(t) = \sum_{l=0}^{L-1} h(l)z(t-l) + i(t) + n^{thermal}(t)$$

Here v is the received (vector due to multiple antennas) signal, h is the radio channel net response, z is the desired (transmitted) signal, i(t) is the interference and $n^{thermal}(t)$ denotes thermal noise. t denotes discrete time.

Taking the Fourier transform, translates the above equation into $$V(m) = H(m)Z(m) + I(m) + N^{thermal}(m)$$

where the quantities are the discrete Fourier transform of the corresponding time domain quantities.

Figure 16:
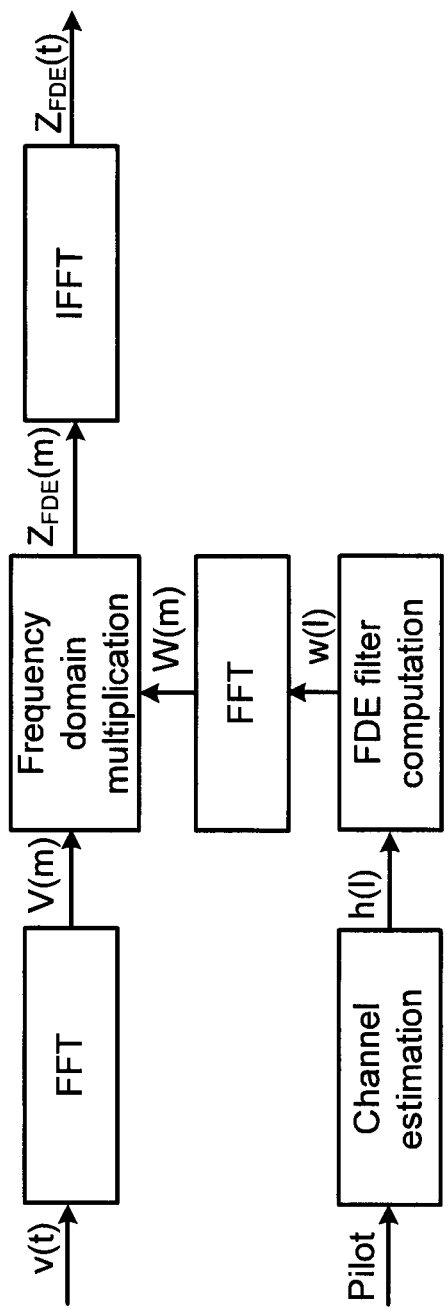
FIG. 16 illustrates one FDE receiver structure.

Now minimum mean square error (MMSE) equalization can be performed on V(m), separately for each user (different from the FDPE structure). For this purpose, the channel is estimated using the pilot signal, below this fact is emphasized by using the subscript $_u$ for user u. FIG. 16 then indicates a first basic method to compute the MMSE filter for the FDE, using time domain calculations.

However, rather than computing the filter coefficients in the time domain and then transforming to the frequency domain as in FIG. 16, the MMSE filter coefficients can be directly computed as $$W_u(m) = H_u^H(m)(H_u^H(m)H_u^H(m) + I_u(m)I_u^H(m) + (N^{thermal}(m))^H N^{thermal}(m))^{-1}$$

$$u = 1, \ldots, U$$

where the thermal noise power floor matrix estimate, can be obtained by any of the algorithms for noise floor estimation described above, and where $H_u(m)$ is the sampled channel frequency response vector for user u. The use of frequency domain computation is less computationally complex than the method depicted in FIG. 16, and represents the preferred embodiment for implementation of the FDE.

Finally, the equalized signal is computed by a frequency domain multiplication as $$Z_{FDE}(m) = W_u(m)V(m), u = 1, \ldots, U$$

after which the inverse FFT is applied to get the signal $Z_{FDE,u}(t)$. After this step processing proceeds as in a conventional WCDMA system. The processing is repeated for all users.

The NBAP and RNSAP protocols allow for signalling of
Received total wideband power (RTWP(t)).
The estimated thermal noise floor.
The received scheduled enhanced uplink power (RSEPS(t)).

The details of the encoding of these messages appear in 3GPP TS 25.433, "UTRAN Iub Interface Node B Application Part (NBAP) Signalling" and 3GPP TS 25.133, "Requirements for support of radio resource management". They are not important as such for the present invention disclosure. The signalling hence breaks the estimated RoT into two pieces, the estimated noise floor and the total wideband power. Note that specification state that it is the quantities at the antenna connector that are to be signalled, signalling of other related quantities ion these containers represents a proprietary solution.

Measurement and Filtering of RoT in the Base Station

To see how load can be estimated taking account of the G-rake+ IS gain, with a sufficiently low computational complexity as compared to the algorithm disclosed in WO2010144004, the powers after weight combining are studied at sufficient statistics level. First, it is assumed that the received signal of user u on code $k \in \Omega_u$ is $$y_{u,k} = h_u s_{u,k} + I_{u,k} + N_{u,k}, u = 1, \ldots, U, k = 1, \ldots, K \quad (A1)$$

where $\Omega_u$ denotes the set of codes for user u, $s_{u,k}$, u=1, . . . ,U, k=1, . . . , K, is the signal, $I_{u,k}$, u=1, . . . ,U, k=1, . . . , K, is the interference and $N_{u,k}$, u=1, . . . ,U, k=1, . . . ,K, is the (thermal) noise signal (not power) and $\hat{h}_u$, u=1, . . . ,U, is the net channel response of user u. G-rake+ then performs weight combining to get the sufficient statistics $z_{u,k}^{G+}$ according to the equations $$\hat{z}_{u,k}^{G+} = \hat{w}_u^H y_{u,k} = \hat{w}_u^H \hat{h}_u s_{u,k} + \hat{w}_u^H I_{u,k} + \hat{w}_u^H N_{u,k},$$
$$u = 1, \ldots, U, k = 1, \ldots, K. \quad (A2)$$

$$\hat{R}_u \hat{w}_u = \hat{h}_u, u = 1, \ldots, U \quad (A3)$$

Here $\hat{w}_u$ are the combining weights of G-rake+, whereas the estimated covariance matrix that models the interference for computation of the combining weights for the users u is given by $\hat{R}_u$. Equations (A2) and (A3) have two main implications; one indicating how power measurements can be done and one indicating the scale factor problem which is addressed below.

Using equation (A2) it can be seen that the effect of the G-rake+ weight combining is the same as if an artificial received signal $z_{u,k}^{G+}$ would be processed. Since these signals obviously reflect the weight combining and thereby the IS gains of the G-rake+ receiver, $z_{u,k}^{G+}$, u=1, . . . ,U, k=1, . . . ,K, is believed to be a relevant starting point for load estimation.

As stated above, the load estimator operates by processing of the RTWP and in the future possibly the RSEPS. For this reason, similar power signals need to be formed from the $z_{u,k}^{G+}$, u=1, . . . ,U, k=1, . . . ,K, in order to reuse the load concept applied without IS.

Squaring (A2) and assuming a low degree of correlation between its three terms, leads to $$|\hat{z}_{u,k}^{G+}|^2 \approx \hat{w}_u^H \hat{h}_u \hat{h}_u^H \hat{w}_u |s_{u,k}|^2 + \hat{w}_u^H I_{u,k} I_{u,k}^H \hat{w}_u + \hat{w}_u^H N_{u,k} N_{u,k}^H \hat{w}_u = S_{u,k}^{G+} + I_{u,k}^{G+} + N_{u,k}^{G+}, u = 1, \ldots, U, k = 1, \ldots, K. \quad (A4)$$

The rise over thermal, as seen by user u is now, by definition $$RoT_u^{G+} \equiv \frac{S_u^{G+} + I_u^{G+} + N_u^{G+}}{N_u^{G+}} \quad (A5)$$

$$S_u^{G+} = \sum_{k \in \Omega_u} S_{u,k}^{G+} \quad (A6)$$

-continued $$I_u^{G+} = \sum_k I_{u,k}^{G+} \quad (A7)$$

$$N_u^{G+} = \sum_k N_{u,k}^{G+} \quad (A8)$$

Note that it is unclear how to distinguish between $S_{u,k}^{G+}$, $I_{u,k}^{G+}$ and $N_{u,k}^{G+}$ for $k \in \Omega_u$. The algorithm disclosed here avoids many of these problems, since both $I_{u,k}^{G+}$ and $N_{u,k}^{G+}$ are computed from other quantities. Note further that in (A4) $S_{u,k}^{G+} = \hat{w}_u^H \hat{h}_u \hat{h}_u^H \hat{w}_u |s_{u,k}|^2$, i.e. the power is expressed starting with the (transmitted) code power $|s_{u,k}|^2$. The same quantity $S_{u,k}^{G+}$ can also be expressed starting with the antenna power $|e_{u,k}|^2 = \hat{h}_u^H \hat{h}_u |s_{u,k}|^2$, in which case $S_{u,k}^{G+} = \hat{w}_u^H \hat{w}_u |e_{u,k}|^2$. This latter setting is used in the link simulations used for validation of the concept. The algorithmic development that follows does however use the definitions (A4)-(A8).

The signal power is computed directly from (A6). Using (A4) and (A6) then results in $$S_u^{G+} = \sum_{k \in \Omega_u} S_{u,k}^{G+} \quad (A9)$$

$$= \hat{w}_u^H \hat{h}_u \hat{h}_u^H \hat{w}_u \sum_{k \in \Omega_u} |s_{u,k}|^2$$

$$= \hat{w}_u^H \hat{h}_u \hat{h}_u^H \hat{w}_u \hat{E}_{s,u}$$

$$= |\hat{w}_u^H \hat{h}_u|^2 \hat{E}_{s,u}$$

$$u = 1, \ldots, U.$$

Note that computation of the signal energy $\hat{E}_{s,u}$ is quite intricate, including e.g. the involved beta factors.

The idea with white noise power floor is to rely on the baseline thermal noise power floor estimation algorithm to estimate the thermal noise power floor before any G-rake+ processing. A main problem then arises since the thermal noise is scaled by $\hat{w}_u$ when the sufficient statistics is evaluated. This means that the thermal noise power level will no longer appear constant.

The approach taken here to circumvent this problem builds on the calculation of the scale factor by which the thermal noise power is scaled. To compute this quantity, first note that when the wideband thermal noise power floor is estimated before G-rake+ processing, e.g. with the baseline noise floor estimator, the following quantity is estimated $$\hat{N} = \frac{1}{M} \sum_{m=1}^{M} \sum_{k=1}^{K} (N_{u,k}^m)^H N_{u,k}^m \xrightarrow{M \to \infty} KE[(N_{u,k})^H N_{u,k}] \quad (A10)$$

$$= K P_{Nu,k}$$

$$= K \frac{1}{K} P_N$$

$$= N_0$$

where $N_0$ is the thermal noise power floor and where m is the sample summation index. The power at the sufficient statistics signal processing point is however $$\hat{N}^{G+} = \frac{1}{M} \sum_{m=1}^{M} \sum_{k=1}^{K} (\hat{w}_u^H N_{u,k}^m)^H \hat{w}_u^H N_{u,k}^m \quad (A11)$$

$$= \frac{1}{M} \sum_{m=1}^{M} \sum_{k=1}^{K} tr((\hat{w}_u^H N_{u,k}^m)^H \hat{w}_u^H N_{u,k}^m)$$

$$= \frac{1}{M} \sum_{m=1}^{M} \sum_{k=1}^{K} tr(\hat{w}_u^H N_{u,k}^m (\hat{w}_u^H N_{u,k}^m)^H)$$

$$= \frac{1}{M} \sum_{m=1}^{M} \sum_{k=1}^{K} tr(\hat{w}_u^H N_{u,k}^m (N_{u,k}^m)^H \hat{w}_u)$$

$$= tr\left(\sum_{k=1}^{K} \hat{w}_u^H \left(\frac{1}{M} \sum_{m=1}^{M} N_{u,k}^m (N_{u,k}^m)^H\right) \hat{w}_u\right) \xrightarrow{M \to \infty}$$

$$tr(K \hat{w}_u^H E[N_{u,k}(N_{u,k})^H] \hat{w}_u)$$

$$= tr(K \hat{w}_u^H (N_0/K) I \hat{w}_u)$$

$$= \hat{w}_u^H \hat{w}_u N_0$$

$$= \hat{w}_u^H \hat{w}_u \hat{N}.$$

The conclusion is that the thermal noise floor at the sufficient statistics signal point can be obtained from the noise floor estimate before G-rake+ processing, by a multiplication with the scale factor $$\kappa_u^{G+} = (\hat{w}_u)^H \hat{w}_u, u=1, \ldots, U. \quad (A12)$$

This gives $$N_u^{G+} = \kappa_u^{G+} \hat{N}, u=1, \ldots, U. \quad (A13)$$

The computation of the scale factor requires an additional inner product for each user.

Now the case where the result of (A10) is replaced by the more general assumption $$\frac{1}{M} \sum_{m=1}^{M} \sum_{k=1}^{K} N_{u,k}^m (N_{u,k}^m)^H \xrightarrow{M \to \infty} KE[N_{u,k}(N_{u,k})^H] = K\frac{N_0}{K} R_N \quad (A14)$$

$$= N_0 R_N.$$

Is discussed, i.e. the case when sampling is fast enough to reflect the shape of the uplink spectrum. In this case it follows that (A10) is transformed to $$\hat{N} = \frac{1}{M} \sum_{m=1}^{M} \sum_{k=1}^{K} (N_{u,k}^m)^H N_{u,k}^m \xrightarrow{M \to \infty} KE[(N_{u,k})^H N_{u,k}] \quad (A15)$$

$$= Ktr(E[N_{u,k}(N_{u,k})^H])$$

$$= N_0 tr(R_N)$$

Furthermore, (A11) is transformed into $$\hat{N}^{G+} = N_0 tr(\hat{w}_u^H R_N \hat{w}_u). \quad (A16)$$

The end result in this case is the scale factor $$\kappa_u^{G+} = \frac{tr(\hat{w}_u^H R_N \hat{w}_u)}{tr(R_N)} \quad (A17)$$

The code power to interference ratio is, $$(C/I)_u^{G+} = \frac{S_u^{G+}}{I_u^{G+} + N_u^{G+}}, u = 1, \ldots, U. \quad (A18)$$

It can be noted that in (A18), all quantities except $I_u^{G+}$ have been computed, see (A11) and (A13). Using these quantities, (A18) can be solved for $I_u^{G+}$, giving $$I_u^{G+} = \frac{S_u^{G+}}{(C/I)_u^{G+}} - \kappa_u^{G+}\hat{N}, u = 1, \ldots, U. \quad (A19)$$

The quantity $(C/I)_u^{G+}$ can be directly related to SINR. This is performed as $$(C/I)_u^{G+} = \frac{\left(\begin{array}{c}\beta_{u,DPCCH}^2 + \beta_{u,EDPCCH}^2 + \\ n_{u,index}\beta_{u,EDPDCH}^2\end{array}\right)}{\beta_{u,DPCCH}^2 SF_{u,DPCCH}} SINR_u^{G+}$$

$$= \frac{\beta_{u,effective}^2}{SF_{u,DPCCH}} SINR_u^{G+} \quad (A20)$$

which gives $$I_u^{G+} = \frac{S_u^{G+}}{(C/I)_u^{G+}} - \kappa_u^{G+}\hat{N} = \frac{SF_{u,DPCCH}}{\beta_{u,effective}^2}\frac{S_u^{G+}}{SINR_u^{G+}} - \kappa_u^{G+}\hat{N}. \quad (A21)$$

When (A9), (A13) and (21) are inserted in (A5), the end result becomes $$RoT_u^{G+} \equiv \frac{S_u^{G+} + I_u^{G+} + \kappa_u^{G+}\hat{N}}{\kappa_u^{G+}\hat{N}} \quad (A22)$$

$$= \frac{S_u^{G+}}{\kappa_u^{G+}\hat{N}}\left(1 + \frac{SF_{u,DPCCH}}{\beta_{u,effective}^2}\frac{1}{SINR_u^{G+}}\right),$$

$$u = 1, \ldots, U.$$

These measures, for each user, are then combined into an uplink measure as outlined below. Note that (A22) provides some interesting insights. When SINR is high then the RoT for the user is essentially determined by the remaining own power of the user—the RoT then increases when the SINR gets worse.

It is clear that the user that sees the maximum total load is the one worst off in terms of coverage and stability. That user is hence used to address the load of the uplink of the cell. The worst case load is defined by the equations $$u_{max} = \underset{u}{\mathrm{argmax}}(RoT_u^{G+}) \quad (A23)$$

$$\max(RoT_u^{G+}) = RoT_{u_{max}}^{G+} \quad (A24)$$

Thus an equivalent of the RoT can be computed after G-rake+ IS gains by $$RoT_u^{G+} \equiv \frac{S_u^{G+} + I_u^{G+} + \kappa_u^{G+}\hat{N}}{\kappa_u^{G+}\hat{N}}$$

$$= \frac{S_u^{G+}}{\kappa_u^{G+}\hat{N}}\left(1 + \frac{SF_{u,EDPCCH}}{\beta_{u,effective}^2}\frac{1}{SINR_u^{G+}}\right),$$

$$u = 1, \ldots, U.$$

$$\kappa_u^{G+} = (\hat{w}_u)^H \hat{w}_u, u = 1, \ldots, U.$$

$$RoT^{G+} = \max_u RoT_u^{G+}$$

Here $RoT_u^{G+}$ is the load seen by user u, $S_u^{G+}$ is the power of user u measured after the G-rake+, $SF_{u,EDPCCH}$ is the spreading factor, $\beta_{u,effective}$ is the total power factor, and $SINR_u^{G+}$ is the signal to interference ration measured after G-rake+, i.e. the quantity that closes the inner power control loop. As can be seen, the cell load is selected as the maximum rise over thermal, as seen by any user of the cell. This is the limiting user of the cell.

Then turning the attention to the FDPE receiver, it holds that $$Z_{pre}(m) = W_{pre}(m)H(m)Z(m) + W_{pre}(m)I(m) + W_{pre}(m)N^{thermal}(m). \quad (B1)$$

Here $Z_{pre}(m)$ denotes the pre-equalized wideband signal in the frequency domain, $W_{pre}(m)$ denotes the wideband pre-equalizing filter in the frequency domain, H(m) denotes the wideband net channel response in the frequency domain, Z(m) denotes the wideband transmitted signal in the frequency domain, I(m) denotes the wideband neighbour cell interference in the frequency domain and $N^{thermal}(m)$ denotes the wideband thermal noise floor signal in the frequency domain. The equation (B1) is readily transformed to the time domain with an inverse discrete Fourier transformation, rendering $$z_{pre}(t) = (w_{pre}h)(t)*z(t) + w_{pre}(t)*i(t) + w_{pre}(t)*n^{thermal}(t) \quad (B2)$$

where the star denotes (multi-dimensional) convolution $z_{pre}(t)$ denotes the pre-equalized wideband signal in the time domain, $w_{pre}(t)$ denotes the wideband finite impulse response of the pre-equalizing filter in the time domain, h(t) denotes the wideband finite impulse response net channel response in the time domain, z(t) denotes the wideband transmitted signal in the time domain, i(t) denotes the wideband neighbour cell interference in the time domain and $n^{thermal}(t)$ denotes the wideband thermal noise floor signal in the time domain. It is important to understand that all signal quantities are here given before the pre-equalization step.

To obtain a measure of the load after FDPE interference whitening the RoT after this step is considered. This is in fact more appealing than for the G-rake+ receiver in that the whole uplink load is addressed at the same time. The RoT measure after FDPE processing is given by $$RoT^{FDPE}(t) = \frac{z_{pre}^H(t)z_{pre}(t)}{E\left[\begin{array}{c}(w_{pre}(t)*n^{thermal}(t))^H \\ (w_{pre}(t)*n^{thermal}(t))\end{array}\right]} \quad (B3)$$

The numerator of (B3) is straightforward to compute. Noting that the time scale for the RoT measurement in WCDMA is normally a transmission time interval (TTI), it follows that the numerator of (14) can be computed e.g. by an average of time samples over the TTI of interest (typically 2 ms or 10 ms).

The computation of the denominator of (B3) requires an evaluation of the expectation of that expression. This can be done assuming the thermal noise to be white and stationary, which is a standard assumption. Note that the evolution here therefore is performed over the time interval where the pre-equalization filter remains constant. It then follows that $$E\left[(w_{pre}(t)*n^{thermal}(t))^H(w_{pre}(t)*n^{thermal}(t))\right] = \quad (B4)$$

$$E\left[\sum_{l_1=0}^{L-1}(n^{thermal}(t-l_1))^H w_{pre}^H(l_1)\sum_{l_2=0}^{L-1}w_{pre}(l_2)n^{thermal}(t-l_2)\right] =$$

$$E\left[\left(\sum_{l_1=0}^{L-1}\sum_{l_2=0}^{L-1}(n^{thermal}(t-l_1))^H w_{pre}^H(l_1)w_{pre}(l_2)n^{thermal}(t-l_2)\right)\right] =$$

$$E\left[\sum_{l_1=0}^{L-1}\sum_{l_2=0}^{L-1}w_{pre}^H(l_1)w_{pre}(l_2)(n^{thermal}(t-l_1))^H n^{thermal}(t-l_2)\right] =$$

$$\sum_{l_1=0}^{L-1}\sum_{l_2=0}^{L-1}w_{pre}^H(l_1)w_{pre}(l_2)E\left[(n^{thermal}(t-l_1))^H n^{thermal}(t-l_2)\right]$$

$$\sum_{l_1=0}^{L-1}\sum_{l_2=0}^{L-1}w_{pre}^H(l_1)w_{pre}(l_2)\delta_{l_1,l_2}\sum_{a=1}^{A}\hat{N}_a^{thermal} =$$

$$\left(\sum_{l=0}^{L-1}w_{pre}^H(l)w_{pre}(l)\right)\left(\sum_{a=1}^{A}\hat{N}_a^{thermal}\right).$$

In (B4) $\hat{N}_a^{thermal}$ denotes the estimated thermal noise floor of antenna branch a, before pre-equalization. This means that prior art noise floor estimation algorithms of 3GPP TS 25.214, "Physical layer procedures (FDD)", 3GPP TS 25.211, "Physical channels and mapping of transport channels onto physical channels (FDD)" and 3GPP TS 25.433, "NBAP, UTRAN Iub interface NBAP signaling" can be re-used. One algorithm is needed for each antenna branch.

Combining (B3) and (B4) results in $$RoT^{FDPE} = \frac{z_{pre}^H(t)z_{pre}(t)}{\left(\sum_{l=0}^{L-1}w_{pre}^H(l)w_{pre}(l)\right)\left(\sum_{a=1}^{A}\hat{N}_a^{thermal}\right)}. \quad (B5)$$

Here $RoT^{FDPE}$ is the load, $z_{pre}(t)$ is the whitened signal in the time domain, $w_{pre}(l)$, $l=0,\ldots,L-1$ is the impulse response of the whitening filter, and $\hat{N}_a^{thermal}$, $a=1,\ldots,A$, are the estimated thermal noise floors of the A antenna branches.

Figure 17:
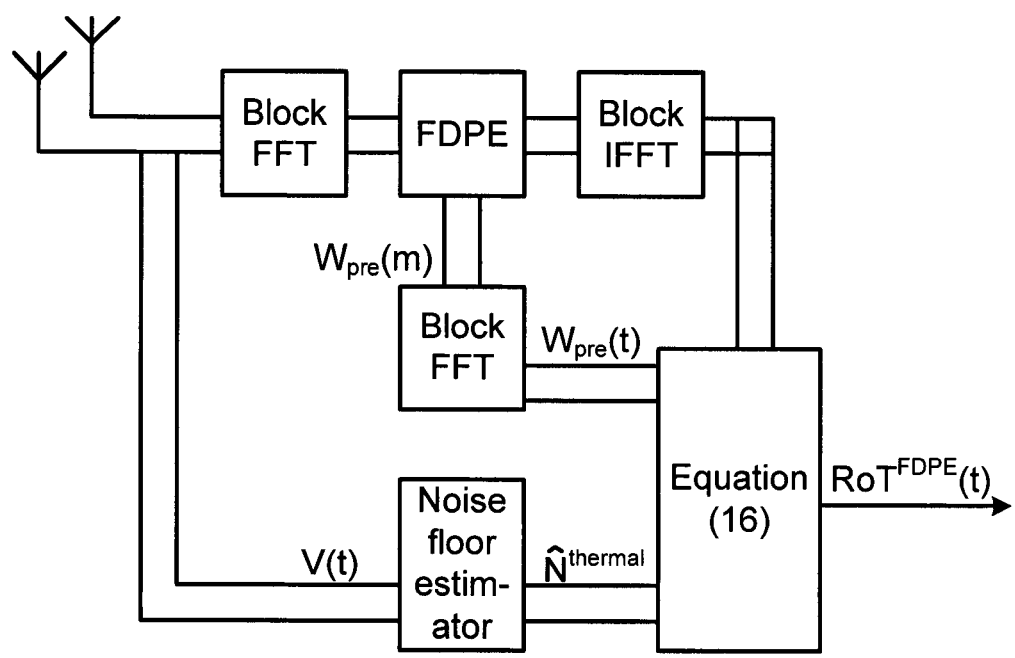
FIG. 17 is a block diagram illustrating load estimation with FDPE.

The quantities above should be computed as averages or estimates over a time interval where the whitening filter of the FDPE remains constant. The result is intuitive. Since the total received wideband power is summed over all antenna branches, so is the thermal noise power floor. The RoT after FDPE is also scaled with the power of the pre-whitening filter. A block diagram of the load estimation solution is depicted in FIG. 17. Only the FDPE blocks are shown there. As can be seen, the main advantage of the FDPE is that the processing is user independent.

It can be noted that the use of FDPE handles the received signal as a whole, without a need to consider individual users. This advantage is retained for the load estimation algorithm.

Finally treating the FDE receiver, the following equation holds, where u denotes user u $$Z_{FDE,u}(m)=W_u(m)H_u(m)Z(m)+W_u(m)I(m)+W_u(m)N^{thermal}(m). \quad (C1)$$

Here $Z_{FDE,u}(m)$ denotes the pre-equalized wideband signal in the frequency domain, $W_u(m)$ denotes the wideband MMSE equalizing filter in the frequency domain, $H_u(m)$ denotes the wideband net channel response in the frequency domain, $Z(m)$ denotes the wideband transmitted signal in the frequency domain, $I(m)$ denotes the wideband neighbour cell interference in the frequency domain and $N^{thermal}(m)$ denotes the wideband thermal noise floor signal in the frequency domain. All signals are vector valued. The equation (C1) is readily transformed to the time domain with an inverse discrete Fourier transformation, rendering $$z_{FDE,u}(t)=(w_u h_u)(t)*z(t)+w_u(t)*i(t)+w_u(t)*n^{thermal}(t), \quad (C2)$$

where the star denotes (multi-dimensional) convolution, $z_{pre,u}(t)$ denotes the equalized wideband signal in the time domain, $w_u(t)$ denotes the wideband finite impulse response of the equalizing filter in the time domain, $h_u(t)$ denotes the wideband finite impulse response net channel response in the time domain, $z(t)$ denotes the wideband transmitted signal in the time domain, $i(t)$ denotes the wideband neighbour cell interference in the time domain and $n^{thermal}(t)$ denotes the wideband thermal noise floor signal in the time domain.

To obtain a measure of the load after the FDE interference whitening, the RoT after this step is considered. The RoT measure after FDPE processing is given by $$RoT_u^{FDE}(t) = \frac{z_{FDE,u}^H(t)z_{FDE,u}(t)}{E[(w_u(t)*n^{thermal}(t))^H(w_u(t)*n^{thermal}(t))]} \quad (C3)$$

The numerator of (C3) is straightforward to compute. Noting that the time scale for the RoT measurement in WCDMA is normally a transmission time interval (TTI), it follows that the numerator of (12) can be computed e.g. by an average of time samples over the TTI of interest (typically 2 ms or 10 ms).

The computation of the denominator of (C3) requires an evaluation of the expectation of that expression. This can be done assuming the thermal noise to be white and stationary, which is a standard assumption. Note that the evolution here therefore is performed over the time interval where the pre-equalization filter remains constant. It then follows that $$E\left[(w_u(t)*n^{thermal}(t))^H(w_u(t)*n^{thermal}(t))\right] = \quad (C4)$$

$$E\left[\sum_{l_1=0}^{L-1}(n^{thermal}(t-l_1))^H w_u^H(l_1)\sum_{l_2=0}^{L-1}w_u(l_2)n^{thermal}(t-l_2)\right] =$$

$$E\left[\left(\sum_{l_1=0}^{L-1}\sum_{l_2=0}^{L-1}(n^{thermal}(t-l_1))^H w_u^H(l_1)w_u(l_2)n^{thermal}(t-l_2)\right)\right] =$$

$$E\left[\sum_{l_1=0}^{L-1}\sum_{l_2=0}^{L-1}w_u^H(l_1)w_u(l_2)(n^{thermal}(t-l_1))^H n^{thermal}(t-l_2)\right] =$$

$$\sum_{l_1=0}^{L-1}\sum_{l_2=0}^{L-1}w_u^H(l_1)w_u(l_2)E\left[(n^{thermal}(t-l_1))^H n^{thermal}(t-l_2)\right]$$

$$\sum_{l_1=0}^{L-1}\sum_{l_2=0}^{L-1}w_u^H(l_1)w_u(l_2)\delta_{l_1,l_2}\sum_{a=1}^{A}\hat{N}_a^{thermal} =$$

-continued $$\left(\sum_{l=0}^{L-1} w_u^H(l)w_u(l)\right)\left(\sum_{a=1}^{A} \hat{N}_a^{thermal}\right).$$

In (C4) $\hat{N}_a^{thermal}$ denotes the estimated thermal noise floor of antenna branch a, before pre-equalization. This means that prior art noise floor estimation algorithms of 3GPP TS 25.214, "Physical layer procedures (FDD)", 3GPP TS 25.211, "Physical channels and mapping of transport channels onto physical channels (FDD)" and 3GPP TS 25.433, "NBAP, UTRAN Iub interface NBAP signaling" can be re-used. One algorithm is needed for each antenna branch.

Combining (C3) and (C4) results in $$RoT_u^{FDE} = \frac{z_{FDE,u}^H(t)z_{FDE,u}(t)}{\left(\sum_{l=0}^{L-1} w_u^H(l)w_u(l)\right)\left(\sum_{a=1}^{A} \hat{N}_a^{thermal}\right)}, u = 1, \ldots, U \quad (C5)$$

Here $RoT_u^{FDE}$ is the load of user u, $z_{pre,u}(t)$ is the whitened signal in the time domain, $w_{pre,u}(l)$, $l=0, \ldots, L-1$ is the impulse response of the whitening filter, and $\hat{N}_a^{thermal}$, $a=1, \ldots, A$, are the estimated thermal noise floors of the A antenna branches.

The quantities above should be computed as averages or estimates over a time interval where the equalizing filter of the FDE remains constant. The result is intuitive. Since the total received wideband power is summed over all antenna branches, so is the thermal noise power floor. The RoT after FDE is also scaled with the power of the equalizing filter.

The above discussion has focused on a single user. However, what is interesting is a load measure for the complete uplink. Since it is likely that it is the user that experiences the highest load that limits the uplink, the uplink load is defined to be $$RoT = \max_u RoT_u^{FDE}, \quad (C6)$$

where $RoT_u^{FDE}$ is the noise rise of user u.

The RoT before and/or after IS processing normally vary fast, being affected e.g. by channel variations. Since the interference estimates that can be used for RACH carrier selection support more slow selection processes, they must rather rely on the average uplink load, obtained for a typical time interval. This time interval or filtering time constant, is preferably tuned to be of the same order as the bandwidth of the carrier selection process.

As a typical embodiment of this filtering process a first order autoregressive filter can be used:

$$\langle RoT \rangle(t+T) = \alpha \langle RoT \rangle(t) + (1-\alpha)RoT_{Input}(t)$$

where $\langle RoT \rangle$ is the average load, T is the update time period, e.g., 10 ms, α is the time constant and $RoT_{Input}$ is any of the RoT at the antenna connector, $RoT^{G+}$, $RoT^{FDPE}$ or $RoT^{FDE}$.

Computation of Offset in the Base Station (BS)

To calculate the offset, an effective load L' is estimated in each cell. This load metric is defined according to the receiver employed for the random access channel preamble. The purpose of the effective load estimate is to capture the characteristics of the receiver at hand and the reference point is selected accordingly.

The cell-relation specific offset $\Delta_{s,n}$ is calculated as the difference in estimated effective load L' in the two cells of interest, I.e., $$\Delta_{s,n} = L_n - L_s$$

The load measures is readily calculated from the filtered RoT according to the well known relation $$L = 1 - \frac{1}{\langle RoT \rangle}$$

Signalling of Offset from the Base Station to the User Equipment for Multi-Carrier Selection To enable a fast cell reselection a (new) HS-SCCH order is introduced to redirect the UE to one or several another carrier to be used for RACH transmission. Each order corresponds to a certain carrier or a set of carriers, which is configured by the network using (new) RRC signalling.

Observe that in case of multi-carrier operations in CELL_FACH, the UE may transmit simultaneously on multiple carriers.

Compensation for Uplink Load and Multi-Carrier Selection in the User Equipment (UE)

Many algorithms may be used in the UE to decide on the multi-carrier selection. Some of them have already been considered earlier in this description.

Signalling of Filtered Load Related Quantities Over NBAP and RNSAP for RNC Carrier Selection.

As stated earlier, the current 3GPP standard allows for signalling of
RTWP.
Noise floor
over Iub. The RoT can be derived in the RNC by a division of RTWP and the noise floor. The quantities are defined at the antenna connector.

In addition to this, in accordance with the present invention is disclosed signalling of at least one of
RoT, as measured after IS processing, i.e. signalling of $RoT^{G+}$, $RoT^{FDPE}$, $RoT^{FDE}$ or $\langle RoT \rangle$. Note that such signalling can be broken down in signalling of a noise floor and a power, related to the noise floor. The signalling can further be defined relative to the prior art noise floor, in the linear or logarithmic domain.
The cell-relation specific offset $\Delta_{s,n}$.
Loads, corresponding to $\langle RoT \rangle$.

In order for the RNC to be able to exploit the measured load quantities, an indicator of the receiver type used for their generation is also disclosed, for signalling from RBS to RNC.

The signalling is performed over NBAP, with forwarding between RNCs using the RNSAP interface when needed.

Computation of Offset in the RNC

In case the effective load per cell is signalled from the RBS to the RNC, the RNC calculates an offset for each cell relation. The computation follows the lines of what was described regarding computation of offset in the RBS earlier.

Signalling of Offset from the RNC

For the sake of completeness, it is stressed that the RNC conveys the cell specific offset to the UE using existing RRC signalling. There is hence no specific new signalling involved in the transmission of the offset from the RNC to the UE.

Time Varying RoT Targets

The RoT target can be time varying. A time-varying RoT target means that higher bit rates may be allocated for some HARQ processes than for others. The random access slots can be announced in order to be time aligned with time periods of relatively low RoT targets.

Figure 18:
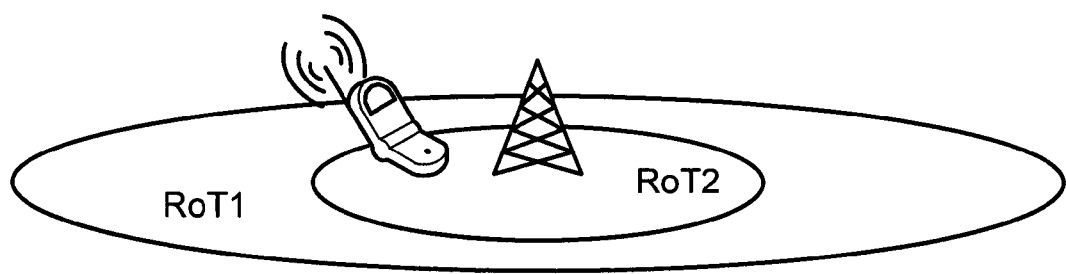
FIG. 18 illustrates uplink coverage of for two different levels of RoT. During times of the low RoT level (RoT1), the cell coverage is wider during times of the high RoT level (RoT2), the cell coverage is narrower.

In a system that exploits TDM, the resources are granted considering different levels of rise over thermal. This means that the random access performance is better during low levels of rise over thermal and vice versa for high levels of rise over thermal. FIG. 18 illustrates the different coverage for the different levels of RoT, and FIG. 19 describes how the RoT target of the NodeB load control varies with time.

Figure 19:
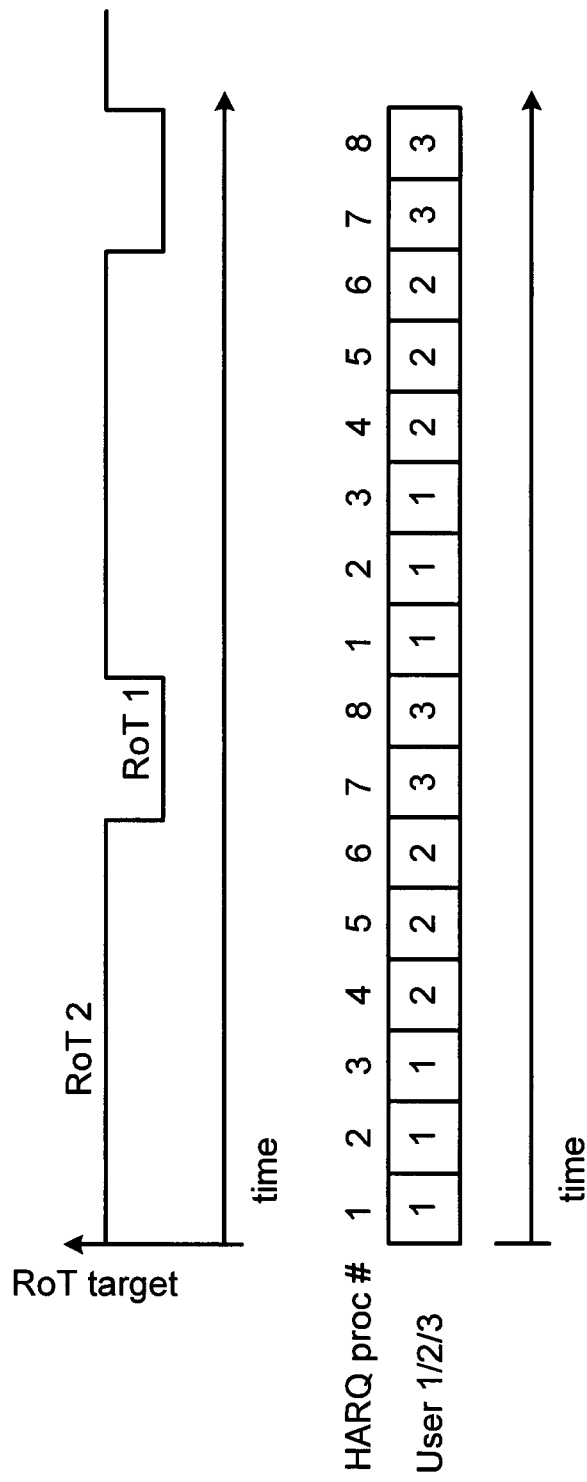
FIG. 19 illustrates different RoT aligned with the HARQ processes, meaning that there are fewer resources that can be allocated for HARQ processes 7 and 8 compared to the other ones.

FIG. 19 illustrates different RoT aligned with the HARQ processes, meaning that there are fewer resources that can be allocated for HARQ processes 7 and 8 compared to the other ones.

It may also be assumed that the operator has access to more than one frequency band for uplink communication. Then the high RoT and data rates will only be enabled on one of the carriers, while the other carrier will operate at a RoT that ensures full uplink coverage. The UE can be enforced to select the less uplink loaded carrier by using the cell individual offsets, see 3GPP TS 25.331, "Radio Resource Control (RRC)" for more information. If the difference in offsets between the carriers is sufficient, then UE's will do random access to the moderately uplink loaded carrier. Furthermore, measurements on RACH can be used to estimate whether the UE may get access on the highly loaded carrier, and an inter-frequency handover can be triggered for all UE's that are capable of high bit rates over E-DCH, possibly only for all UE's with certain priority or subscription.

In addition, the HARQ processes are made aligned with the Acquisition channel AICH with acceptable accuracy. This means that the times of low RoT can be aligned with specific RACH sub-channels. The consequence is that some RACH sub-channels correspond to better coverage than others. Thus, the better RACH coverage can be assigned to specific access service classes by associating the sub-channels in such a manner. Moreover, it is also possible to restrict the allowed RACH sub-channels to only the ones with better RACH coverage.

The invention claimed is:

1. A method in at least one radio network node for handling carrier selection, the method comprising:
   measuring at least one of interference or load levels on at least two uplink carriers, said measurement being performed in at least one sector of each carrier, wherein the interference or load levels on the at least two uplink carriers are varying in time, wherein random access slots associated with time periods during which the interference or load levels on the at least two uplink carriers are low are announced, and wherein the step of measuring the interference or load levels on at least two uplink carriers is performed during the time periods;
   calculating an offset based on said measured interference or load levels on the at least two uplink carriers, said offset reflecting the interference or load difference between said at least two uplink carriers; and
   signaling said offset to a communication device, thereby allowing said communication device to base its carrier selection for random access at least on said measured interference or load levels on said at least two uplink carriers.

2. The method of claim 1, wherein the step of measuring said interference or load levels on the at least two uplink carriers comprises providing filtered interference or load level measurement for said at least two uplink carriers, for use in calculating the offset.

3. The method of claim 1, wherein, if a receiver used in the step of measuring the interference or load levels on the at least two uplink carriers has interference suppressing (IS) capabilities, the method further includes compensating the offset for such interference suppression.

4. The method of claim 3, wherein said step of compensating the offset comprises compensating the offset directly, to account for the interference suppression, or compensating said measured interference or load levels on said at least two uplink carriers to account for the interference suppression, for use in calculating the offset.

5. The method of claim 1, wherein, if a receiver used in the step of measuring the interference or load levels on the at least two uplink carriers has interference cancellation (IC) capabilities, the method further comprises compensating the offset for such interference cancellation.

6. The method of claim 5, wherein said step of compensating the offset comprises compensating the offset directly, to account for the interference cancellation, or compensating said measured interference or load levels on said at least two uplink carriers to account for the interference cancellation, for use in calculating the offset.

7. The method of claim 1, wherein the step of signaling further comprises signaling to said communication device an identification of the receiver type used in the step of measuring.

8. The method of claim 1, wherein the step of signaling further comprises signaling to said communication device an identification of a mapping between said at least two uplink carriers and corresponding downlink carriers.

9. The method of claim 1, wherein the radio network node and the communication device have multi-carrier communication capabilities.

10. The method of claim 9, wherein the offset is signaled to the communication device via Layer 1 or Layer 2 signaling.

11. The method of claim 1, wherein the offset is signaled to the communication device relayed over at least one of a NBAP (Node B Application Part) or a RNSAP (Radio Network Subsystem Application Part).

12. The method of claim 1, wherein said at least two uplink carriers on which said interference or load levels are measured are selected as a subset of available uplink carriers when the communication device is in CELL_FACH state.

13. The method of claim 1, wherein said at least one radio network node comprises a base station.

14. The method of claim 1, wherein said at least one radio network node comprises a radio network controller.

15. The method of claim 1, wherein the measured interference levels are levels of received total wideband power, neighbor cell interference, own cell interference, or thermal noise.

16. The method of claim 1, wherein the measured load levels are noise rise or rise over Thermal (RoT) levels.

17. A method in a communication device for handling carrier selection, the method comprising:
   receiving from a radio network node an offset calculated based on measured interference or load levels on at least two uplink carriers in at least one sector of each of the carriers, said offset reflecting at least one of the interference or load difference between said at least two uplink carriers;
   performing carrier selection for random access based at least on said received offset; and
   receiving an identification of the mapping between the at least two uplink carriers and corresponding downlink carriers, and performing the carrier selection further based on said identification of the mapping.

18. The method of claim 17, further comprising receiving an identification of the receiver used in the measurement of the interference or load levels on the at least two uplink carriers, and performing the carrier selection further based on said identification of the receiver.

19. A radio network arrangement configured for handling carrier selection and comprising:
- a receiver and an associated measurement processor configured to measure interference or load levels on at least two uplink carriers, said measurement being performed in at least one sector of each carrier, wherein the interference or load levels on the at least two uplink carriers are varying in time, wherein random access slots associated with time periods during which the interference or load levels on the at least two uplink carriers are low are announced, and wherein the interference or load levels on at least two uplink carriers are measured during the time periods;
- a calculation processor configured to calculate an offset based on the measured interference or load levels on the at least two uplink carriers, said offset reflecting the interference or load difference between said at least two uplink carriers; and
- a transmitter and an associated signaling processor configured to signal said offset to a communication device, thereby allowing said communication device to base its carrier selection for random access at least on the interference or load levels on said at least two uplink carriers.

20. The arrangement of claim 19, wherein the signaling processor is further configured to signal to the communication device an identification of the receiver type used in the step of measuring.

21. The arrangement of claim 19, wherein the signaling processor is further configured to signal to the communication device an identification of a mapping between said at least two uplink carriers and corresponding downlink carriers.

22. A communication device configured to handle carrier selection and comprising:
- a receiver configured to receive from a radio network node an offset calculated based on measured interference or load levels on at least two uplink carriers in at least one sector of each of the carriers, said offset reflecting the interference or load difference between said at least two uplink carriers; and
- a selection processor configured to perform carrier selection for random access, based at least on the interference or load levels on the uplink carriers;
- wherein the receiver is further configured to receiver, via said receiver, an identification of the mapping between the at least two uplink carriers and corresponding downlink carriers, and to perform carrier selection further based on said identification of the mapping.

23. The device of claim 22, wherein the signaling processor is further configured to receive, via said receiver, an identification of the receiver type used in the measurement of the interference or load levels on the at least two uplink carriers and to perform carrier selection further based on said identification of the receiver type.

* * * * *